(12) United States Patent
Lam et al.

(10) Patent No.: US 12,527,880 B2
(45) Date of Patent: Jan. 20, 2026

(54) CYANINE-BASED TELODENDRIMERS AND USES FOR TREATING CANCER

(71) Applicant: The Regents of the University of California, Oakland, CA (US)

(72) Inventors: Kit S. Lam, Davis, CA (US); Lu Zhang, Sacramento, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 639 days.

(21) Appl. No.: 17/272,021

(22) PCT Filed: Aug. 30, 2019

(86) PCT No.: PCT/US2019/049080
§ 371 (c)(1),
(2) Date: Feb. 26, 2021

(87) PCT Pub. No.: WO2020/047418
PCT Pub. Date: Mar. 5, 2020

(65) Prior Publication Data
US 2021/0346518 A1     Nov. 11, 2021

Related U.S. Application Data

(60) Provisional application No. 62/725,540, filed on Aug. 31, 2018.

(51) Int. Cl.
| | |
|---|---|
| A61K 47/69 | (2017.01) |
| A61K 9/51 | (2006.01) |
| A61K 31/4745 | (2006.01) |
| A61K 31/704 | (2006.01) |
| A61K 41/00 | (2020.01) |
| A61K 47/54 | (2017.01) |
| A61K 47/68 | (2017.01) |
| A61K 49/00 | (2006.01) |
| A61N 5/06 | (2006.01) |
| A61P 35/00 | (2006.01) |
| C08G 65/333 | (2006.01) |

(52) U.S. Cl.
CPC ........ *A61K 47/6935* (2017.08); *A61K 9/5146* (2013.01); *A61K 9/5192* (2013.01); *A61K 31/4745* (2013.01); *A61K 31/704* (2013.01); *A61K 41/0057* (2013.01); *A61K 47/554* (2017.08); *A61K 47/6885* (2017.08); *A61K 49/0034* (2013.01); *A61K 49/0093* (2013.01); *A61N 5/062* (2013.01); *A61P 35/00* (2018.01); *C08G 65/33396* (2013.01); A61N 2005/0659 (2013.01)

(58) Field of Classification Search
CPC ............ A61K 47/6935; A61K 47/6885; A61K 47/554; A61K 9/5146; A61K 9/5192; A61K 31/4745; A61P 35/00
USPC ........................................................ 424/9.1
See application file for complete search history.

(56) References Cited

U.S. PATENT DOCUMENTS

| | | |
|---|---|---|
| 5,459,159 A | 10/1995 | Pandey et al. |
| 6,365,191 B1 | 4/2002 | Burman et al. |
| 6,403,625 B1 * | 6/2002 | Nagao ................... G01N 33/582 514/369 |
| 6,630,128 B1 | 10/2003 | Love et al. |
| 6,699,508 B1 | 3/2004 | Sugi et al. |
| 7,125,567 B2 | 10/2006 | Sugi et al. |
| 7,824,709 B2 | 11/2010 | Ryan et al. |
| 8,895,055 B2 | 11/2014 | Lam et al. |
| 9,579,400 B2 | 2/2017 | Lam et al. |
| 9,642,916 B2 | 5/2017 | Lam et al. |
| 10,106,650 B2 | 10/2018 | Lam et al. |
| 10,238,570 B2 | 3/2019 | Hathaway, III |
| 10,406,233 B2 | 9/2019 | Luo et al. |
| 10,556,021 B2 | 2/2020 | Lam et al. |
| 11,192,978 B2 | 12/2021 | Lam et al. |
| 11,369,688 B2 | 6/2022 | Lam et al. |
| 2002/0041898 A1 | 4/2002 | Unger et al. |
| 2003/0027863 A1 | 2/2003 | Cruz et al. |
| 2003/0073679 A1 | 4/2003 | Mody et al. |
| 2005/0281777 A1 | 12/2005 | Albrecht et al. |
| 2006/0013885 A1 | 1/2006 | Nah et al. |
| 2006/0127310 A1 | 6/2006 | Russell-jones et al. |
| 2008/0188399 A1 | 8/2008 | Sinko et al. |
| 2009/0203706 A1 | 8/2009 | Zhao et al. |
| 2010/0158994 A1 | 6/2010 | Watkin |
| 2011/0286915 A1 | 11/2011 | Lam et al. |
| 2012/0253191 A1 | 10/2012 | Zheng et al. |
| 2014/0363371 A1 | 12/2014 | Luo et al. |
| 2015/0045419 A1 | 2/2015 | Lam et al. |

(Continued)

FOREIGN PATENT DOCUMENTS

| | | |
|---|---|---|
| CN | 105816877 | 3/2016 |
| EP | 1230934 A1 | 8/2002 |

(Continued)

OTHER PUBLICATIONS

Hill University of California Thesis, 2016, 1-47 (Year: 2016).*
HIII https://search.library.ucdavis.edu/discovery/fulldisplay?docid=alma9981189743003126&context=L&vid=01UCD_INST:UCD&lang=en&search_scope=DN_and_CI&adaptor=Local%20Search%20Engine&tab=UCSILSDefaultSearch&query=any,contains,brianna%20hill, accessed Apr. 25, 2024. (Year: 2016).*
International Search Report in PCT/US2017/051862, mailed on Jan. 11, 2018, 10 pages.
International Search Report for International Application No. PCT/US2013/074762, mailed on Apr. 21, 2014, 18 pages.
International Search Report received for PCT Patent International Application No. PCT/US2009/057852, Mailed on May 6, 2010, 14 pages.

(Continued)

*Primary Examiner* — Michael G. Hartley
*Assistant Examiner* — Sean R Donohue
(74) *Attorney, Agent, or Firm* — Mintz Levin Cohn Ferris Glovsky and Popeo, P.C.

(57) ABSTRACT

The present invention provides a cyanine modified telodendrimer, nanoparticles thereof, and methods of using the nanoparticles to treat various diseases such as cancer.

13 Claims, 16 Drawing Sheets

(56) References Cited

U.S. PATENT DOCUMENTS

| | | |
|---|---|---|
| 2015/0056139 A1 | 2/2015 | Luo et al. |
| 2016/0038605 A1 | 2/2016 | Lam et al. |
| 2018/0036417 A1 | 2/2018 | Lam et al. |
| 2019/0112423 A1 | 4/2019 | Lam et al. |
| 2019/0358338 A1 | 11/2019 | Lam et al. |
| 2020/0046841 A1 | 2/2020 | Lam et al. |

FOREIGN PATENT DOCUMENTS

| | | | | |
|---|---|---|---|---|
| EP | 1724295 | A1 | 11/2006 | |
| EP | 1967212 | A2 | 9/2008 | |
| EP | 2087912 | A1 | 8/2009 | |
| EP | 2793953 | A1 | 10/2014 | |
| EP | 2931290 | A1 | 10/2015 | |
| JP | 2001146556 | A | 5/2001 | |
| JP | 2005255810 | A | 9/2005 | |
| JP | 2012503603 | A | 2/2012 | |
| WO | 9959550 | A1 | 11/1999 | |
| WO | 0008467 | A2 | 2/2000 | |
| WO | 2007084126 | A1 | 7/2007 | |
| WO | 2008062909 | A1 | 5/2008 | |
| WO | 2008091246 | A1 | 7/2008 | |
| WO | 2008091247 | A1 | 7/2008 | |
| WO | 2009123934 | A2 | 10/2009 | |
| WO | 2009155335 | A2 | 12/2009 | |
| WO | 2010039496 | A2 | 4/2010 | |
| WO | 2010148346 | A2 | 12/2010 | |
| WO | 2012126115 | A1 | 9/2012 | |
| WO | WO-2012128326 | A1 * | 9/2012 | ........... A61K 31/404 |
| WO | 2012158622 | A2 | 11/2012 | |
| WO | 2013096388 | A1 | 6/2013 | |
| WO | 2014093675 | A1 | 6/2014 | |
| WO | 2016172635 | A1 | 10/2016 | |
| WO | 2018053316 | A1 | 3/2018 | |
| WO | 2018136778 | A1 | 7/2018 | |
| WO | 2019051121 | A1 | 3/2019 | |

OTHER PUBLICATIONS

International Search Report received for PCT Patent International Application No. PCT/US2012/070508, Mailed on Feb. 27, 2013, 9 pages.
International Search Report received for PCT Patent International Application No. PCT/US2019/049080, mailed on Nov. 15, 2019, 7 pages.
International Search Report received for PCT Patent International Application No. PCT/US2012/037794, mailed on Jan. 28, 2013, 10 pages.
Chapman et al. (1994) "Hydraamphiphiles: Novel Linear Dendritic Block Copolymer Surfactants", Journal of the American Chemical Society, 116:11195-11196.
Chen et al. (Feb. 23, 2008) "Fluorescence Study of Inclusion Complexes between Star-Shaped Cholic Acid Derivatives and Polycyclic Aromatic Fluorescent Probes and the Size Effects of Host and Guest Molecule", The Journal of Physical Chemistry B, 112(11):3402-3409.
Choi et al. (1999) "Poly(ethylene glycol)-block-poly(L-lysine) Dendrimer: Novel Linear Polymer/Dendrimer Block Copolymer Forming a Spherical Water-Soluble Polyionic Complex with DNA", Bioconjugate Chem., 10:62-65.
Duncan et al. (May 2003) "The Dawning Era of Polymer Therapeutics", Nature Reviews Drug Discovery, 2(5):347-360.
Giuntini et al. (2011) "Synthetic Approaches for the Conjugation of Porphyrins and Related Macrocycles to Peptides and Proteins", Photochemical & Photobiological Sciences, 10(5):759-791.
Gref et al. (Mar. 18, 1994) "Biodegradable Long-Circulating Polymeric Nanospheres", Science, 263(5153):1600-1603.
Gu et al. (Dec. 21, 2007) "pH-Triggered Reversible "Stealth" Polycationic Micelles", Biomacromolecules, 9(1):255-262.
Heffernan et al. (Oct. 2009) "Disulfide-Crosslinked Polyion Micelles for Delivery of Protein Therapeutics", Annals of Biomedical Engineering volume, 37(10):1993-2002.
Huh et al. (Jan. 3, 2005) "Hydrotropic Polymer Micelle System for Delivery of Paclitaxel", Journal of Controlled Release, 101(1-3):59-68.
Kaminskas et al. (Dec. 3, 2009) "PEGylation of Polylysine Dendrimers Improves Absorption and Lymphatic Targeting Following SC Administration in Rats", Journal of Controlled Release, 140(2):108-116.
Kaminskas et al. (Apr. 5, 2008) "The Impact of Molecular Weight and PEG Chain Length on the Systemic Pharmacokinetics of PEGylated Poly L-lysine Dendrimers", Molecular Pharmaceutics, 5(3):449-463.
Li et al. (Jun. 15, 2010) "A Novel Size-tunable Nanocarrier System for Targeted Anticancer Drug Delivery", Journal of Controlled Release, 144(3):314-323(23 Pages).
Li et al. (Jun. 1999) "Antimicrobial Activities of Amine- and Guanidine-Functionalized Cholic Acid Derivatives", Antimicrobial Agents and Chemotherapy, 43(6):1347-1349.
Li et al. (Nov. 2007) "Dendrimer Generation Effects on Photodynamic Efficacy of Dendrimer Porphyrins and Dendrimer-Loaded Supramolecular Nanocarriers", Chemistry of Materials, 19(23):5557-5562.
Li et al. (2012) "Well-Defined, Reversible Boronate Crosslinked Nanocarriers for Targeted Drug Delivery in Response to Acidic Ph Values and Cis-Diols.", Angewandte Chemie, 51(12):2864-2869.
Li et al. (Jan. 17, 2012) "Well-Defined, Reversible Boronate Cross-linked Nanocarriers for Targeted Drug Delivery in Response to Acidic pH Values and cis-Diols", Angewandte Chemie, 124(12):2918-2923.
Li et al. (Sep. 2011) "Well-defined, Reversible Disulfide Cross-linked Micelles for On-demand Paclitaxel Delivery", Biomaterials, 32(27):6633-6645(30 pages).
Luo et al. (2009) "Asymmetric Poly(ethylene glycol) Star Polymers with a Cholic Acid Core and Their Aggregation Properties", Biomacromolecules, 10(4):900-906.
Luo et al. (Jul. 21, 2010) "Well-defined, Size-tunable, Multifunctional Micelles for Efficient Paclitaxel Delivery for Cancer Treatment", Bioconjugate Chemistry, 21(7):1216-1224(23 pages).
Vijayalakshmi et al. (Jun. 23, 2005) "A Simple Construction of a Bile Acid Based Dendritic Light Harvesting System", Organic Letters, 7(13):2727-2730.
Xiao et al. (Oct. 2009) "A Self-assembling Nanoparticle for Paclitaxel Delivery in Ovarian Cancer", Biomaterials, 30(30):6006-6016.
Xiao et al. (Oct. 30, 2011) "PEG-oligocholic Acid Telodendrimer Micelles for the Targeted Delivery of Doxorubicin to B-cell Lymphoma", Journal of Controlled Release, 155(2):272-281(24 pages).
Xiao et al. (Oct. 2013) "Telodendrimer-based Nanocarriers for the Treatment of Ovarian Cancer", Therapeutic Delivery, 4(10):1279-1292(24 pages).
Al-Muhammed et al. (1996) "In-Vivo Studies on Dexamethasone Sodium Phosphate Liposomes", Journal of Microencapsulation, 13(3):293-306.
Chonn et al. (1995) "Recent Advances in Liposomal Drug-Delivery Systems", Current Opinion in Biotechnology, 6(6):698-708.
Eyles et al. (Jul. 1997) "Oral Delivery and Fate of Poly(Lactic Acid) Microsphere-Encapsulated Interferon in Rats", Journal of Pharmacy and Pharmacology, 49(7):669-674.
Gao et al. (Jun. 1995) "Controlled Release of a Contraceptive Steroid from Biodegradable and Injectable Gel Formulations: In Vitro Evaluation", Pharmaceutical Research, 12(6):857-863.
Minto et al. (Apr. 1, 1997) "Pharmacokinetics and Pharmacodynamics of Nandrolone Esters in Oil Vehicle: Effects of Ester, Injection Site and Injection Volume", The Journal of Pharmacology and Experimental Therapeutics, 281(1):93-102.
Ostro et al. (1989) "Use of Liposomes as Injectable-Drug Delivery Systems", American Journal of Health-System Pharmacy, 46(8):1576-1587.
Rao K. Paduranga (1995) "Recent Developments of Collagen-Based Materials for Medical Applications and Drug Delivery Systems", Journal of Biomaterials Science, Polymer Edition, 7(7):623-645.

(56) References Cited

OTHER PUBLICATIONS

Rohatagi et al. (1995) "Pharmacokinetic and Pharmacodynamic Evaluation of Triamcinolone Acetonide After Intravenous, Oral, and Inhaled Administration", Journal of Clinical Pharmacology, 35(12):1187-1193.

Tjwa et al. (1995) "Budesonide Inhaled via Turbuhaler: A More Effective Treatment for Asthma than Beclomethasone Dipropionate via Rotahaler", Annals of Allergy, Asthma & Immunology, 75(2):107-111.

Zhang et al. (Aug. 2014) "Nanomicelle Formulation Modifies the Pharmacokinetic Profiles and Cardiac Toxicity of Daunorubicin", Nanomedicine (Lond), 9(12):1807-1820.

Chen et al., "Photothermal therapy with immune-adjuvant nanoparticles together with checkpoint blockade for effective cancer immunotherapy", Nature Communications, 2016, 7, pp. 1-13.

Zhang et al., "Unique Photochem-Immuno-Nanoplatform against Orthotopic Xenograft Oral Cancer and Metastatic Syngeneic Breast Cancer", Nano Letters, 2018, 18(11), 7092-7103.

\* cited by examiner

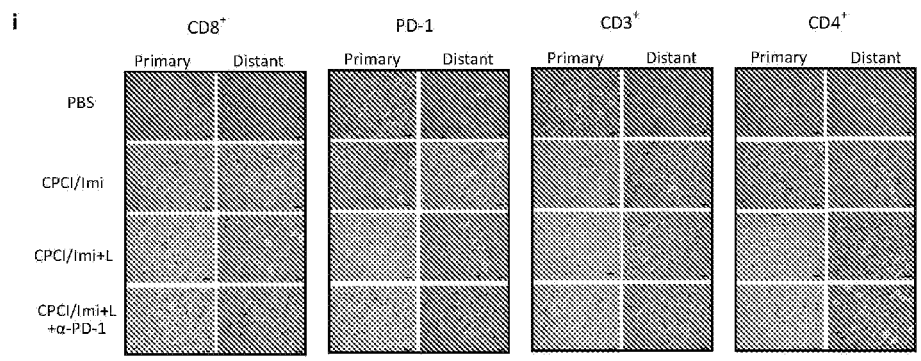
FIG. 8
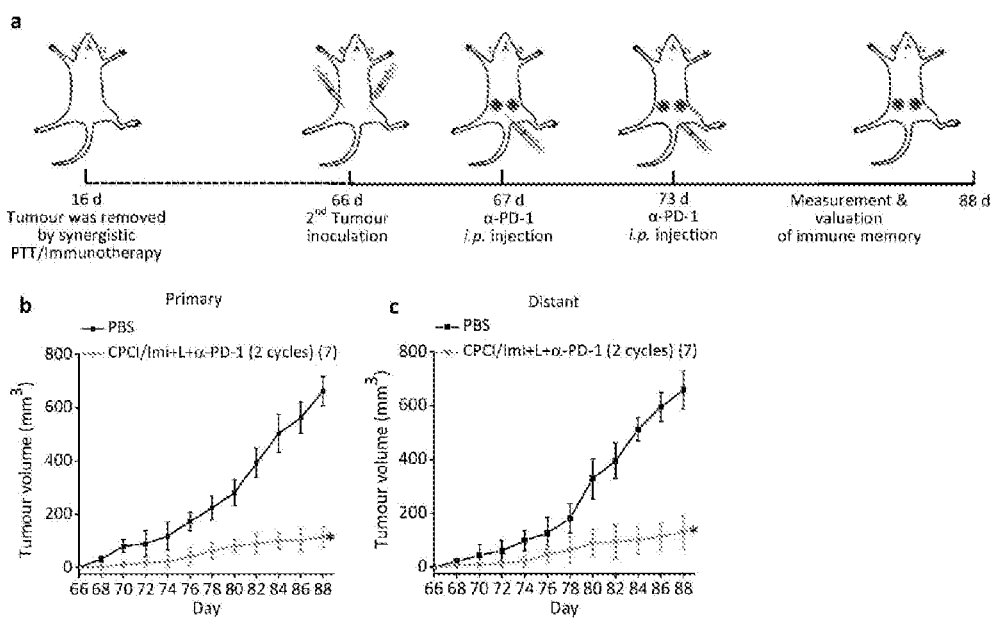

CYANINE-BASED TELODENDRIMERS AND USES FOR TREATING CANCER

CROSS-REFERENCES TO RELATED APPLICATIONS

This application claims priority to International PCT Application No. PCT/US2019/049080, filed Aug. 30, 2019 which claims priority to U.S. Provisional Application No. 62/725,540, filed Aug. 31, 2018, the contents of which are incorporated herein by reference in their entirety.

STATEMENT AS TO RIGHTS TO INVENTIONS MADE UNDER FEDERALLY SPONSORED RESEARCH AND DEVELOPMENT

This invention was made with Government support under Grant No. 2R01CA115483-06, R01EB012569 and UJ01CA198880 awarded by the National Institutes of Health (NIH). The Government has certain rights in this invention.

BACKGROUND OF THE INVENTION

Near-infrared photothermal conversion agents (PTCAs) with strong and controllable optical properties have emerged as promising agents for biosensing, bioimaging, and therapeutic applications. Light-triggered photothermal therapy (PTT) using PTCAs has exhibited several therapeutic advantages for local cancer therapy. These include high spatial resolution, improved target selectivity, low to modest adverse side effects, noninvasiveness without a need for surgery, fast and effective treatment, negligible drug resistance and relatively low cost.

To date, many near-infrared PTCAs for PTT have been investigated in various tumor models, using agents such as porphyrin, phthalocyanine, chlorin e6 (Ce6), gold based nanomaterials, carbon nanotubes and graphene oxide. Some conventional cyanine dyes have also been used as the intermediates for light-mediated biomedical applications in the clinic. For example, indocyanine green (ICG), the only near-infrared agent approved by the U.S. Food and Drug Administration (FDA), has been widely used clinically as optical contrast for determination of cardiac output, liver function and blood flow, as well as in ophthalmic angiography, highlighting the potential of using organic small molecular dyes for clinical translation and practical applications. The vast majority of these PTCAs, however, still face significant challenges in PTT clinical translation. These include poor biocompatibility (e.g. inorganic nanoagents), low photothermal conversion efficiency and intrinsic poor stability (rapid clearance from kidney or liver in vivo and poor resistance to photo-bleaching, e.g. small-molecule dyes) The most vital prerequisite for improving photothermal conversion efficiency is to increase light absorption in the target tissue and limit excited photo-conversion agents releasing energy in the form of non-thermal energy. Efficient PTCAs with strong absorption in the near-infrared interrogation window (>800 nm) are preferred, because near-infrared light can penetrate much deeper tissue, limit interference with blood and tissue, cause less photodamage to normal tissues and lower photon tissue attenuation. Additional strategies to increase photothermal conversion efficiency are to increase the gather density/structure and optical-absorption cross-section of PTCAs at the target tumor sites.

There have been many recent reports on using biocompatible photothermal nanomaterials to physically encapsulate organic small molecules such as porphyrin, Ce6 or ICG to improve the pharmacokinetics and tumor targeting efficiency of these small-molecule dyes. However, the photothermal conversion efficiency for this class of photothermal materials is low because of short excitation wavelength (e.g. 650 nm for porphyrin or Ce6) and therefore low tissue penetration and circulating leaks. Polymers and macromolecules based PTCAs generally possess better photo-stability than organic small-molecule PTCAs or their nanoformulations, especially more stable after self-assembly of PTCAs into nanoparticles (NPs). These resulting nanostructure avoids circulating leaks and rapidly clearance from kidney or liver to some extent. In the past decade, a 25-50 nm micellar nanoplatform comprised of linear PEG and dendritic cholic-acid based amphiphilic polymer (aka telodendrimer) as building blocks was developed. A few years ago, development of a hybrid telodendrimers with cholic acid and porphyrin, which could self-assemble to form micellar nanoporphyrin with favorable photothermal properties was reported.

In general, applications of PTT is limited to the treatment of localized tumors that are accessible to light irradiation. It also has potential to be used intraoperatively to treat the tumor bed when patients' tumor sites are exposed during surgery. Concurrent chemotherapy in combination with PTT could potentially be synergistic. For metastatic tumors, PTT may be useful when given in combination with immunotherapy as local photothermal effects at the tumor site have potential of activating systemic anti-tumor immune response. Durable clinical responses have been seen in some patients treated with check point blockade antibodies. It is well known that programmed cell death protein 1 (PD-1) as an immune checkpoint guards against autoimmunity through a dual mechanism of promoting apoptosis in antigen-specific T-cells in lymph nodes while simultaneously reducing apoptosis in regulatory T cells. Immunotherapy aiming at PD-1 checkpoint strategy is considered as a promising therapy approach for distal metastasis tumor. Although promising, PD-1 checkpoint blockade-based immunotherapies have limited response rate (~20%) and benefit only patients whose tumors have been pre-infiltrated by T cells. Therefore, the synergistic therapy strategy combining immunotherapy with other efficient therapeutic approaches have been the current trend of cancer treatment. Recent researches discovered that PTT not only could directly kill tumor cells upon laser irradiation by inducing apoptosis and necrosis, but also could generate anti-tumor immunological responses to improve systemic immunotherapy effect by producing tumor-associate agents from ablated tumor cell residues. Such an effect has also been observed in a preliminary clinical trial study.

Herein, a novel telodendrimer-based photothermal nanoparticle as high-performance PTCA and controlled delivery system for cancer therapy is reported. The orthotopic OSC-3 oral cancer xenograft and metastatic 4T1 syngeneic breast cancer model were studied to evaluate the synergetic effects via combination PTT/chemotherapy and PTT/immunotherapy, respectively (FIG. 1). This photothermal nanoparticle stemmed from a novel type of hybrid telodendrimer (PEG$^{5K}$-CA$_4$-ICGD$_4$, PCI) containing linear PEG block (Mr≈5000), four dendritic hydrophobic photothermal conversion agents (indocyanine green derivatives, ICGD) and four dendritic cholic acids (CA), a facial amphiphile. In order to further increase nanoparticles stability and photothermal conversion efficiency, another telodendrimer, comprised of PEG, four cysteines, eight hydrophilic linkers, and eight cholic acids (PEG$^{5K}$-Cys$_4$-L$_8$-CA$_8$, PCLC), was added to PCI at 1:1 ratio, and then co-assembled under neutral environment to form micelles. The final disulfide cross-linked micellar nanosystem (CPCI-NP) (FIG. 2a) possessed ideal smaller size, longer in vivo circulation time, preferential tumor targeting and deeper tumor penetration. To enhance tumor response, doxorubicin was incorporated into the nanosystem and evaluated the combination photothermal/chemotherapy against orthotopic OSC-3 oral cancer xenograft model. In addition, the application of CPCI nanoplatform loaded with imiquimod, a potent immune agonist, in conjunction with PD-1 checkpoint antibody as potent photo-immunotherapy against 4T1 syngeneic breast cancer model was explored.

BRIEF SUMMARY OF THE INVENTION

In one embodiment, the present invention provides a compound of formula (I):

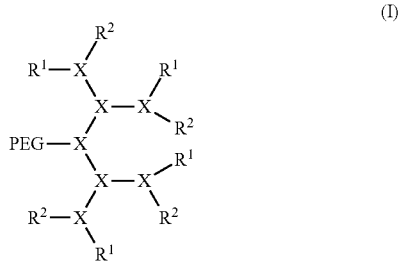

wherein PEG is a polyethylene glycol (PEG) polymer, wherein each PEG polymer has a molecular weight of 1-100 kDa; each X is a branched monomer unit; each R$^1$ is independently cholic acid or a cholic acid derivative; and each R$^2$ is independently a cyanine.

In another embodiment, the present invention provides a nanoparticle comprising a plurality of first conjugates, wherein each first conjugate is independently a compound of the formula (I) as described herein, wherein the plurality of conjugates self-assembles in an aqueous solvent to form the nanoparticle such that a hydrophobic core is formed in the interior of the nanoparticle, wherein the PEG of each conjugate self-assembles on the exterior of the nanoparticle.

In another embodiment, the present invention provides a method of treating a disease, the method comprising administering a therapeutically effective amount of a nanoparticle of the present invention, to a subject in need thereof.

In another embodiment, the present invention provides a method of treating a disease via photothermal therapy, the method comprising administering a therapeutically effective amount of a nanoparticle of the present invention, to a subject in need thereof, and exposing the subject to radiation, thereby treating the disease via photothermal therapy.

In another embodiment, the present invention provides a method of treating a subject suffering from a diseased tissue, the method comprising: administering an effective amount of nanoparticles of the present invention, to the subject such that the nanoparticles concentrate in the diseased tissue; irradiating at a first wavelength the diseased tissue to identify the diseased tissue; and removing the diseased tissue from the subject, thereby treating the subject.

In another embodiment, the present invention provides a method of imaging, the method comprising: administering an effective amount of nanoparticles of the present invention, to a subject in need thereof; and imaging the subject.

In another embodiment, the present invention provides a method of preparing a nanoparticle of the present invention, comprising: forming a reaction mixture comprising a plurality of first conjugates of formula (I) as described herein, wherein the conjugates self-assemble to form nanoparticles such that a hydrophobic core is formed in the interior of the nanoparticle, wherein the PEG of each conjugate self-assembles on the exterior of the nanoparticle.

BRIEF DESCRIPTION OF THE DRAWINGS

FIG. 8 shows immune memory effect of synergistic photothermal-immunotherapy. (a) Schematic illustration of immune-memory by inhibiting cancer relapses at primary and distant sites. (b) Primary tumour and (c) distant tumour growth curves of rechallenged tumours inoculated 50 days post eliminated of their first tumours (intraperitoneal injection of α-PD-1 200 μg per mouse on day 67 and 73).

DETAILED DESCRIPTION OF THE INVENTION

I. Definitions

Figure 1:
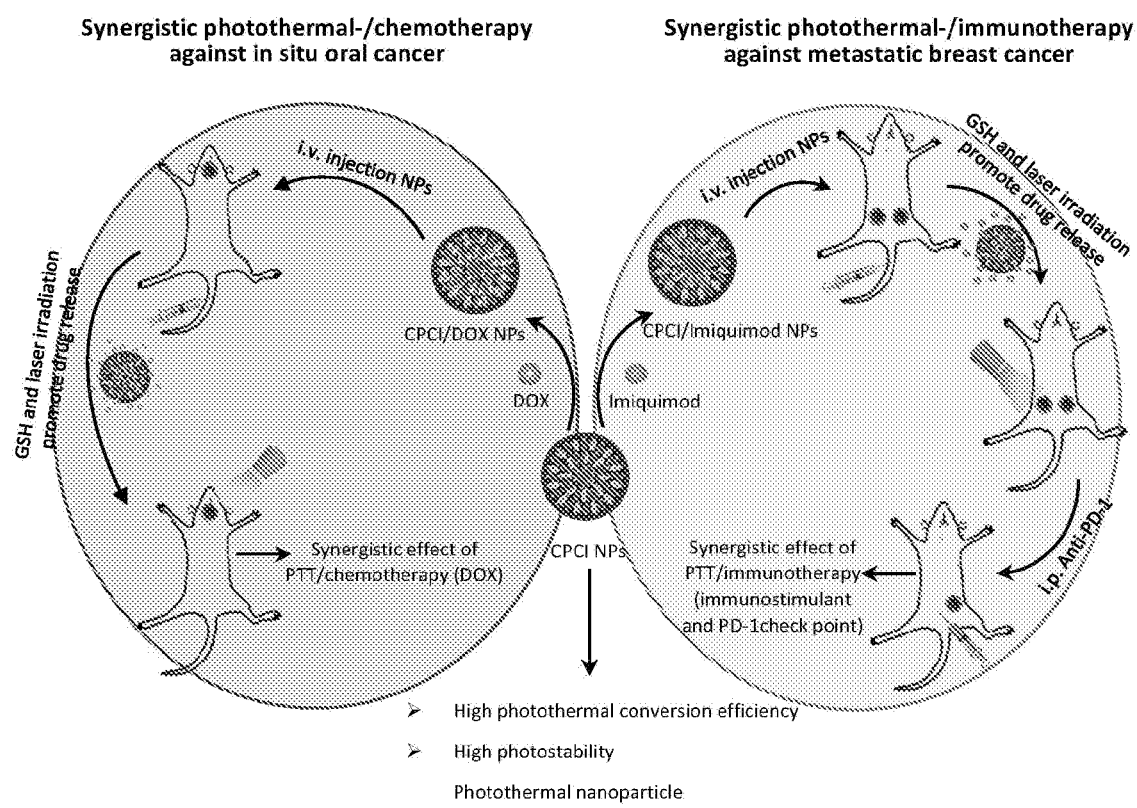
FIG. 1 shows a schematic illustration of high-performance photothermal therapy nanomedicine (CPCI NPs) combines with chemotherapy against in situ oral cancer and combines with immunotherapy against metastatic breast cancer.

Unless specifically indicated otherwise, all technical and scientific terms used herein have the same meaning as commonly understood by those of ordinary skill in the art to which this invention belongs. In addition, any method or material similar or equivalent to a method or material described herein can be used in the practice of the present invention. For purposes of the present invention, the following terms are defined.

"A," "an," or "the" as used herein not only include aspects with one member, but also include aspects with more than one member. For instance, the singular forms "a," "an," and "the" include plural referents unless the context clearly dictates otherwise. Thus, for example, reference to "a cell" includes a plurality of such cells and reference to "the agent" includes reference to one or more agents known to those skilled in the art, and so forth.

As used herein, the terms "dendrimer" and "dendritic polymer" refer to branched polymers containing a focal point, a plurality of branched monomer units, and a plurality of end groups. The monomers are linked together to form arms (or "dendrons") extending from the focal point and terminating at the end groups. The focal point of the dendrimer can be attached to other segments of the compounds of the invention, and the end groups may be further functionalized with additional chemical moieties.

As used herein, the term "telodendrimer" refers to a dendrimer containing a hydrophilic PEG segment and one or more chemical moieties covalently bonded to one or more end groups of the dendrimer. These moieties can include, but are not limited to, hydrophobic groups, hydrophilic groups, amphiphilic compounds, and organic moieties. Different moieties may be selectively installed at a desired end group using orthogonal protecting group strategies."

As used herein, the terms "monomer" "monomer unit" or "branched monomer unit" refer to a diamino carboxylic acid, a dihydroxy carboxylic acid or a hydroxyl amino carboxylic acid. Examples of diamino carboxylic acid groups of the present invention include, but are not limited to, 2,3-diamino propanoic acid, 2,4-diaminobutanoic acid, 2,5-diaminopentanoic acid (ornithine), 2,6-diaminohexanoic acid (lysine), (2-Aminoethyl)-cysteine, 3-amino-2-aminomethyl propanoic acid, 3-amino-2-aminomethyl-2-methyl propanoic acid, 4-amino-2-(2-aminoethyl) butyric acid and 5-amino-2-(3-aminopropyl) pentanoic acid. Examples of dihydroxy carboxylic acid groups of the present invention include, but are not limited to, glyceric acid, 2,4-dihydroxybutyric acid, glyceric acid, 2,4-dihydroxybutyric acid, 2,2-Bis(hydroxymethyl)propionic acid and 2,2-Bis(hydroxymethyl)butyric acid. Examples of hydroxyl amino carboxylic acids include, but are not limited to, serine and homoserine. One of skill in the art will appreciate that other monomer units are useful in the present invention.

As used herein, the term "amino acid" refers to a carboxylic acid bearing an amine functional group. Amino acids include the diamino carboxylic acids described above. Amino acids include naturally occurring α-amino acids, wherein the amine is bound to the carbon adjacent to the carbonyl carbon of the carboxylic acid. Examples of naturally occurring α-amino acids include, but are not limited to, L-aspartic acid, L-glutamic acid, L-histidine, L-lysine, and L-arginine. Amino acids may also include the D-enantiomers of naturally occurring α-amino acids, as well as β-amino acids and other non-naturally occurring amino acids.

As used herein, the term "cholic acid" refers to (R)-4-((3R,5S,7R,8R,9S,10S,12S,13R,14S,17R)-3,7,12-trihydroxy-10,13-dimethylhexadecahydro-1H-cyclopenta[a]phenanthren-17-yl)pentanoic acid. Cholic acid is also known as 3α,7α,12α-trihydroxy-5β-cholanoic acid; 3-α,7-α,12-α-Trihydroxy-5-cholan-24-oic acid; 17-β-(1-methyl-3-carboxypropyl)etiocholane-3α,7α,12α-triol; cholalic acid; and cholalin. Cholic acid derivatives and analogs, such as allocholic acid, pythocholic acid, avicholic acid, deoxycholic acid, chenodeoxycholic acid, are also useful in the present invention. Cholic acid derivatives can be designed to modulate the properties of the nanocarriers resulting from telodendrimer assembly, such as micelle stability and membrane activity. For example, the cholic acid derivatives can have hydrophilic faces that are modified with one or more glycerol groups, aminopropanediol groups, or other groups.

As used herein, the term "cyanine" refers to a synthetic dye family belonging to a polymethine group. Cyanines can be used as fluorescent dyes for biomedical imaging. Cyanines can be streptocyanines (also known as open chain cyanines), hemicyanines, and closed chain cyanines. Closed chain cyanines have nitrogens which are each independently part of a heteroaromatic moiety.

As used herein, the term "nanoparticle" or "nanocarrier" refers to a micelle resulting from aggregation of the dendrimer conjugates of the invention. The nanocarrier has a hydrophobic core and a hydrophilic exterior.

As used herein, the term "amphiphilic compound" refers to a compound having both hydrophobic portions and hydrophilic portions. For example, the amphiphilic compounds of the present invention can have one hydrophilic face of the compound and one hydrophobic face of the compound. Amphiphilic compounds useful in the present invention include, but are not limited to, cholic acid and cholic acid analogs and derivatives.

As used herein, the term "crosslinkable group" or "crosslinking group" refers to a functional group capable of binding to a similar or complementary group on another molecule, for example, a first crosslinkable group on a first dendritic polymer linking to a second crosslinkable group on a second dendritic polymer. "Thiol containing crosslinking group" refers to crosslinking groups which contain a sulfur atom. Groups suitable as crosslinkable and crosslinking groups in the present invention when incorporated into the interior of a dendrimer include thiols such as cysteine, boronic acids and 1,2-diols including 1,2-dihydroxybenzenes such as catechol. Groups suitable as crosslinkable and crosslinking groups in the present invention when incorporated at one or more end groups of a dendrimer include thiols such as cysteine and N-acetyl-cysteine. When the crosslinkable and crosslinking groups combine, they form crosslinked bonds such as disulfides and boronic esters. Other crosslinkable and crosslinking groups are suitable in the present invention As used herein, the term "linking group" refers to a chemical moiety that links one segment of a dendrimer conjugate to another. The types of bonds used to link the linker to the segments of the dendrimers include, but are not limited to, amides, amines, esters, carbamates, ureas, thioethers, thiocarbamates, thiocarbonate and thioureas. One of skill in the art will appreciate that other types of bonds are useful in the present invention.

As used herein, the terms "drug" or "therapeutic agent" refers to an agent capable of treating and/or ameliorating a condition or disease. A drug may be a hydrophobic drug, which is any drug that repels water. Hydrophobic drugs useful in the present invention include, but are not limited to, a taxane (e.g., paclitaxel, docetaxel, cabazitaxel, Baccatin III, 10-deacetylbaccatin, Hongdoushan A, Hongdoushan B, or Hongdoushan C), doxorubicin, etoposide, irinotecan, SN-38, cyclosporin A, podophyllotoxin, Carmustine, Amphotericin, Ixabepilone, Patupilone (epothelone class), rapamycin and platinum drugs. Other drugs includes non-steroidal anti-inflammatory drugs, and vinca alkaloids such as vinblastine and vincristine. The drugs of the present invention also include prodrug forms. One of skill in the art will appreciate that other drugs are useful in the present invention.

As used herein, the terms "treat", "treating" and "treatment" refers to any indicia of success in the treatment or amelioration of an injury, pathology, condition, or symptom (e.g., pain), including any objective or subjective parameter such as abatement; remission; diminishing of symptoms or making the symptom, injury, pathology or condition more tolerable to the patient; decreasing the frequency or duration of the symptom or condition; or, in some situations, preventing the onset of the symptom or condition. The treatment or amelioration of symptoms can be based on any objective or subjective parameter; including, e.g., the result of a physical examination.

As used herein, the term "administering" refers to oral administration, administration as a suppository, topical contact, parenteral, intravenous, intraperitoneal, intramuscular, intralesional, intranasal or subcutaneous administration, intrathecal administration, or the implantation of a slow-release device e.g., a mini-osmotic pump, to the subject.

As used herein, the terms "therapeutically effective amount or dose" or "therapeutically sufficient amount or dose" or "effective or sufficient amount or dose" refer to a dose that produces therapeutic effects for which it is administered. The exact dose will depend on the purpose of the treatment, and will be ascertainable by one skilled in the art using known techniques (see, e.g., Lieberman, *Pharmaceutical Dosage Forms* (vols. 1-3, 1992); Lloyd, *The Art, Science and Technology of Pharmaceutical Compounding* (1999); Pickar, *Dosage Calculations* (1999); and *Remington: The Science and Practice of Pharmacy,* 20th Edition, 2003, Gennaro, Ed., Lippincott, Williams & Wilkins). In sensitized cells, the therapeutically effective dose can often be lower than the conventional therapeutically effective dose for non-sensitized cells.

As used herein, the term "subject" refers to animals such as mammals, including, but not limited to, primates (e.g., humans), cows, sheep, goats, horses, dogs, cats, rabbits, rats, mice and the like. In some embodiments, the subject is a human.

As used herein, the term "disease" refers to an abnormal condition that negatively affects the structure or function of part or all of an organism, which is not due to any external injury. Diseases are often construed as medical conditions that are associated with specific symptoms and signs. Diseases may include cancer, immunodeficiency, hypersensitivity, allergies, and autoimmune disorders.

As used herein, the term "diseased tissue" refers to cell tissue which is part of the diseases described herein.

As used herein, the term "check point blockade antibody" refers to an antibody which inhibits immune check points, key regulators of the immune system that when stimulated, can dampen the immune response to an immunologic stimulus. The check point blockade antibody may block inhibitory checkpoints, restoring immune system function. Examples of check point blockade antibody includes, but are not limited to anti-PD-1, anti-PDL-1, anti-PDL-2 and anti-CTLA-4.

As used herein, the term "photothermal therapy" refers to use of nontoxic, light-sensitive compounds that generate heat upon exposure to light. Like photodynamic therapy, photothermal therapy involves a photosensitizer and a source of light, typically infrared. But photothermal therapy does not require oxygen. A variety of photosensitizers can be used, including porphyrins, chlorophylls and dyes.

As used herein, the term "radiation" refers to the emission or transmission of energy in the form of waves or particles through space or through a material medium and "irradiation" refers to the process by which an object is exposed to radiation. In some examples, irradiation can include use of infra-red light.

II. Cyanine Telodendrimers

In some embodiments, the present invention provides a compound of formula (I):

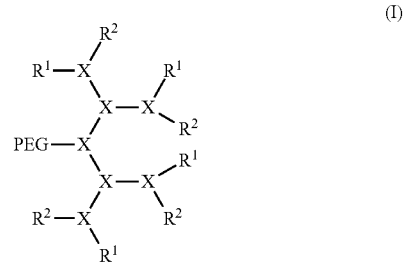

wherein: PEG is a polyethylene glycol (PEG) polymer, wherein each PEG polymer has a molecular weight of 1-100 kDa; each X is a branched monomer unit; each $R^1$ is independently cholic acid or a cholic acid derivative; and each $R^2$ is independently a cyanine.

Polyethylene glycol (PEG) polymers of any size and architecture are useful in telodendrimers of the present invention. In some embodiments, the PEG is from 1-100 kDa. In some embodiments, the PEG is from 1-50 kDa. In some embodiments, the PEG is from 1-10 kDa. In some embodiments, the PEG is about 10 kDa, about 9 kDa, about 8 kDa, about 7 kDa, about 6 kDa, about 5 kDa, about 4 kDa, about 3 kDa, about 2 kDa, or about 1 kDa. In some embodiments, the PEG is about 5 kDa. One of skill in the art will appreciate that other PEG polymers and other hydrophilic polymers are useful in the present invention. PEG can be any suitable length.

The dendritic polymer can be made of branched monomer unit X including amino acids or other bifunctional AB2-type monomers, where A and B are two different functional groups capable of reacting together such that the resulting polymer chain has a branch point where an A-B bond is formed. In some embodiments, each branched monomer unit X can be a diamino carboxylic acid, a dihydroxy carboxylic acid and a hydroxyl amino carboxylic acid. In some embodiments, X is a diamino carboxylic acid. In some embodiments, each diamino carboxylic acid can be 2,3-diamino propanoic acid, 2,4-diaminobutanoic acid, 2,5-diaminopentanoic acid (ornithine), 2,6-diaminohexanoic acid (lysine), (2-Aminoethyl)-cysteine, 3-amino-2-aminomethyl propanoic acid, 3-amino-2-aminomethyl-2-methyl propanoic acid, 4-amino-2-(2-aminoethyl) butyric acid or 5-amino-2-(3-aminopropyl) pentanoic acid. In some embodiments, each dihydroxy carboxylic acid can be glyceric acid, 2,4-dihydroxybutyric acid, 2,2-Bis(hydroxymethyl)propionic acid, 2,2-Bis(hydroxymethyl)butyric acid, serine or threonine. In some embodiments, each hydroxyl amino carboxylic acid can be serine or homoserine. In some embodiments, the diamino carboxylic acid is an amino acid. In some embodiments, each branched monomer unit X is a diamino carboxylic acid, wherein each diaminocarboxylic acid is lysine.

Amphiphilic compounds useful in the present invention include, but are not limited to, cholic acid and cholic acid analogs and derivatives. "Cholic acid" refers to (R)-4-((3R,5S,7R,8R,9S,10S,12S,13R,14S,17R)-3,7,12-trihydroxy-10,13-dimethylhexadecahydro-1H-cyclopenta[a]phenanthren-17-yl)pentanoic acid, having the structure:

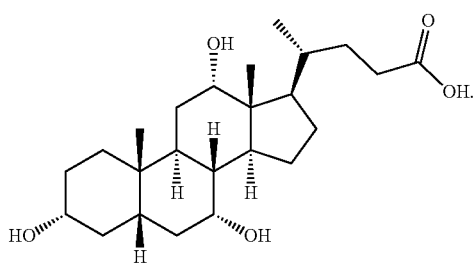

Cholic acid derivatives and analogs include, but are not limited to, allocholic acid, pythocholic acid, avicholic acid, deoxycholic acid, and chenodeoxycholic acid. Cholic acid derivatives can be designed to modulate the properties of the nanocarriers resulting from telodendrimer assembly, such as micelle stability and membrane activity. For example, the cholic acid derivatives can have hydrophilic faces that are modified with one or more glycerol groups, aminopropanediol groups, or other groups.

In some embodiments, each $R^1$ is independently cholic acid, $(3\alpha,5\beta,7\alpha,12\alpha)$-7,12-dihydroxy-3-(2,3-dihydroxy-1-propoxy)-cholic acid (CA-4OH), $(3\alpha,5\beta,7\alpha,12\alpha)$-7-hydroxy-3,12-di(2,3-dihydroxy-1-propoxy)-cholic acid (CA-5OH), or $(3\alpha,5\beta,7\alpha,12\alpha)$-7,12-dihydroxy-3-(3-amino-2-hydroxy-1-propoxy)-cholic acid (CA-3OH—NH$_2$). In some embodiments, each $R^1$ is cholic acid.

Cyanines of the present invention refers to a synthetic dye family belonging to a polymethine group comprising at least one quaternary amine. Cyanines may be used for imaging. In some embodiments, cyanines can be streptocyanines, hemicyanines, or closed chain cyanines. Hemicyanines can have the following structure:

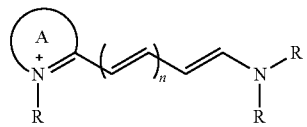

wherein n is an integer from 0 to 5 and the ring A is a heteroaromatic moiety. Closed chain cyanines have nitrogens which are each independently part of a heteroaromatic moiety, and can have the following structure:

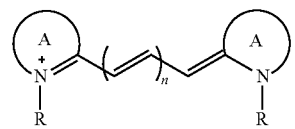

wherein n is an integer from 0 to 5 and the rings A are independently heteroaromatic moieties. The heteroaromatic moiety can be pyrrole, imidazole, thiazole, pyridine, quinolone, indole, benzoindole or benzothiazole, each of which can optionally be substituted with 1-4 functional groups selected from the group consisting of $C_{1-6}$ alkyl and sulfonate. The R groups are each independently selected from the group consisting of $C_{1-10}$ alkyl $(CH_2)_mSO_3Na$ and $(CH_2)_mCOOH$ wherein m is an integer from 1 to 10.

In some embodiments, each $R^2$ is independently cyanine 3, cyanine 3.5, cyanine 5, cyanine 5.5, cyanine 7, cyanine 7.5, indocyanine green, or a indocyanine green derivative with a structure (S1):

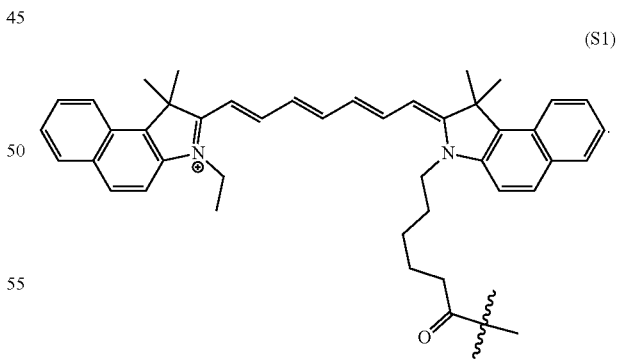

(S1)

In some embodiments, each $R^2$ is a cyanine with the structure (S1).

In some embodiments, the compound can be a compound of formula (I) wherein: each PEG has a molecular weight of 5 kDa; each X is lysine; each $R^1$ is cholic acid; and each $R^2$ is independently a cyanine with the structure (S1). In some embodiments, the compound have the following structure:

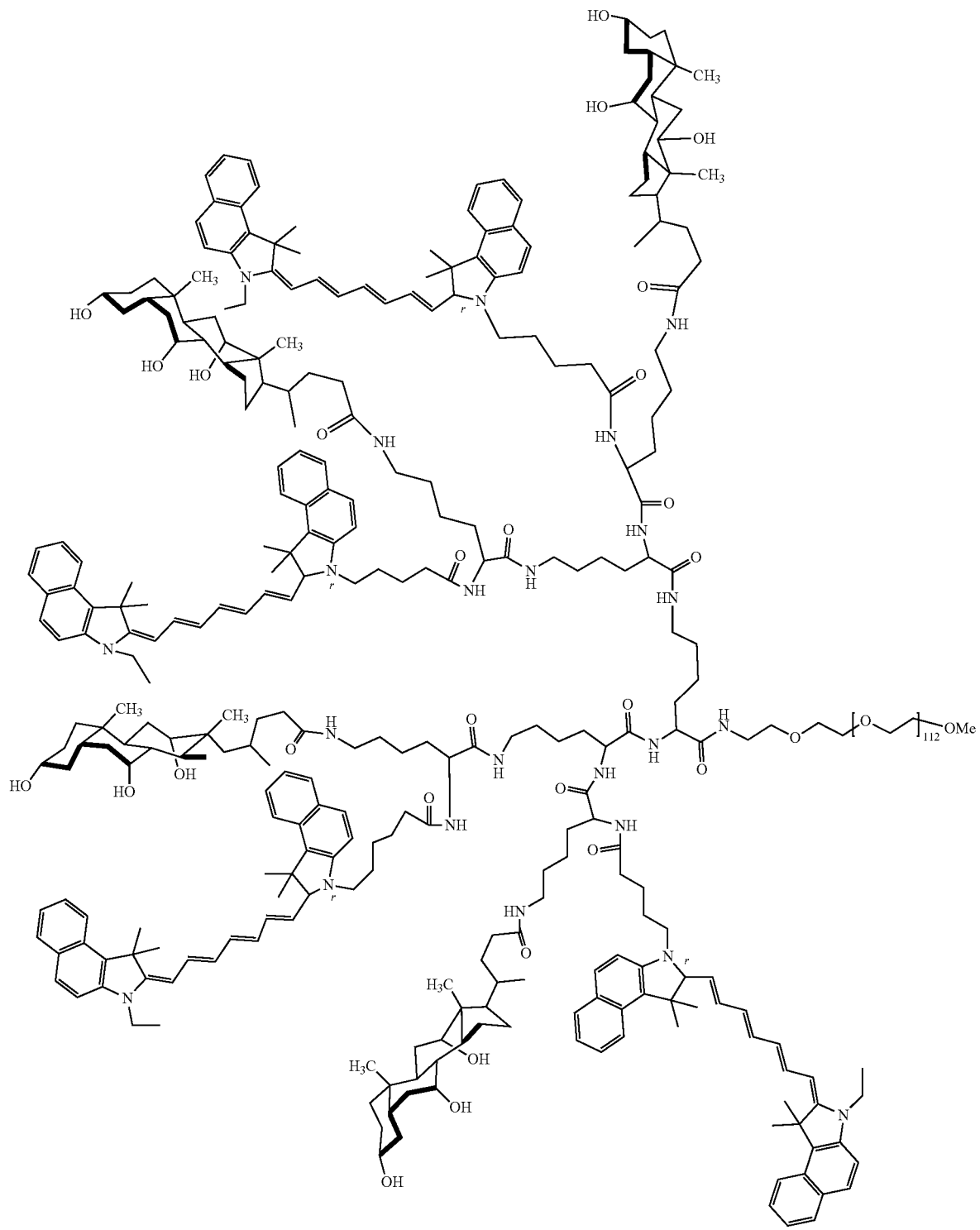

III. Nanoparticles

The telodendrimers of the present invention provide aggregates to form nanocarriers with a hydrophobic core and a hydrophilic exterior. In some embodiments, the invention provides a nanocarrier having an interior and an exterior, the nanocarrier comprising one or more of the dendrimer conjugates of the invention, wherein each compound self-assembles in an aqueous solvent to form the nanocarrier such that a hydrophobic pocket is formed in the interior of the nanocarrier, and wherein the PEG of each compound self-assembles on the exterior of the nanocarrier.

In some embodiments, the present invention provides a nanoparticle comprising a plurality of first conjugates, wherein each first conjugate is independently a compound of formula (I) as described herein, wherein: the plurality of conjugates self-assembles in an aqueous solvent to form the nanoparticle such that a hydrophobic core is formed in the interior of the nanoparticle wherein the PEG of each conjugate self-assembles on the exterior of the nanoparticle.

The plurality of first conjugates useful in the present invention includes conjugates of formula (I) as described herein. In some embodiments, the nanoparticle further comprises a plurality of second conjugates wherein each second conjugate is independently a compound of formula (II):

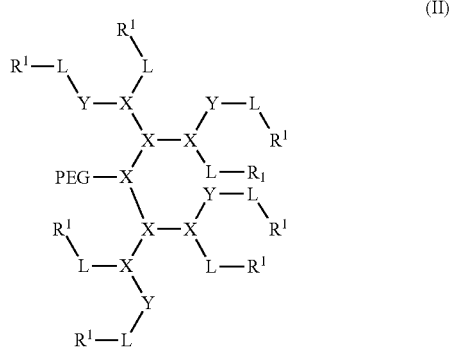

wherein: PEG is a polyethylene glycol (PEG) polymer, wherein each PEG polymer has a molecular weight of 1-100 kDa; each X is a branched monomer unit; each Y is a thiol containing crosslinking group; each L is a linking group; and each $R^1$ is independently cholic acid or a cholic acid derivative.

Polyethylene glycol (PEG) polymers of any size and architecture are useful in telodendrimers of the present invention for compounds of formula II. In some embodiments, the PEG is from 1-100 kDa. In some embodiments, the PEG is from 1-50 kDa. In some embodiments, the PEG is from 1-10 kDa. In some embodiments, the PEG is about 10 kDa, about 9 kDa, about 8 kDa, about 7 kDa, about 6 kDa, about 5 kDa, about 4 kDa, about 3 kDa, about 2 kDa, or about 1 kDa. In some embodiments, the PEG is about 5 kDa. One of skill in the art will appreciate that other PEG polymers and other hydrophilic polymers are useful in the present invention. PEG can be any suitable length.

Branched monomer units useful in the present invention include any suitable amino acids or other bifunctional AB2-type monomers, where A and B are two different functional groups capable of reacting together such that the resulting polymer chain has a branch point where an A-B bond is formed In some embodiments, each branched monomer unit X can be a diamino carboxylic acid, a dihydroxy carboxylic acid and a hydroxyl amino carboxylic acid. In some embodiments, X is a diamino carboxylic acid. In some embodiments, each diamino carboxylic acid can be 2,3-diaminopropanoic acid, 2,4-diaminobutanoic acid, 2,5-diaminopentanoic acid (ornithine), 2,6-diaminohexanoic acid (lysine), (2-Aminoethyl)-cysteine, 3-amino-2-aminomethyl propanoic acid, 3-amino-2-aminomethyl-2-methyl propanoic acid, 4-amino-2-(2-aminoethyl) butyric acid or 5-amino-2-(3-aminopropyl) pentanoic acid. In some embodiments, each dihydroxy carboxylic acid can be glyceric acid, 2,4-dihydroxybutyric acid, 2,2-Bis(hydroxymethyl)propionic acid, 2,2-Bis(hydroxymethyl)butyric acid, serine or threonine. In some embodiments, each hydroxyl amino carboxylic acid can be serine or homoserine. In some embodiments, the diamino carboxylic acid is an amino acid. In some embodiments, each branched monomer unit X is a diamino carboxylic acid, wherein each diaminocarboxylic acid is lysine.

The linking group L can include any suitable linker. In general, the linking groups are bifunctional linkers, having two functional groups for reaction with each of two telodendrimer segments. In some examples, the linking group can be a heterobifunctional linker. In some examples, the linking group can be a homobifunctional linker. In some examples, the linking group L can be polyethylene glycol, polyserine, polyglycine, poly(serine-glycine), aliphatic amino acids, 6-amino hexanoic acid, 5-amino pentanoic acid, 4-amino butanoic acid or beta-alanine. In some embodiments, linking group L is the Ebes linker having the formula:

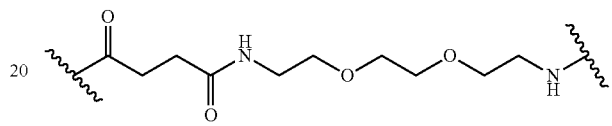

One of skill in the art will recognize that the size and chemical nature of the linking group can be varied based on the structures of the telodendrimer segments to be linked.

In some embodiments, the nanoparticle of the present invention comprises first and/or second conjugates wherein each $R^1$ is independently cholic acid or a cholic acid derivative. each $R^1$ is independently cholic acid, $(3\alpha,5\beta,7\alpha,12\alpha)$-7,12-dihydroxy-3-(2,3-dihydroxy-1-propoxy)-cholic acid (CA-4OH), $(3\alpha,5\beta,7\alpha,12\alpha)$-7-hydroxy-3,12-di(2,3-dihydroxy-1-propoxy)-cholic acid (CA-5OH), or $(3\alpha,5\beta,7\alpha,12\alpha)$-7,12-dihydroxy-3-(3-amino-2-hydroxy-1-propoxy)-cholic acid (CA-3OH—NH$_2$). In some embodiments, each $R^1$ is cholic acid.

In some embodiments, the nanoparticle comprises a first conjugate of formula (I) wherein each PEG has a molecular weight of 5 kDa, each X is lysine, each $R^1$ is cholic acid, and each $R^2$ is a cyanine with the structure (S1). In some embodiments, the nanoparticle further comprises a second conjugate of formula (II) wherein each PEG has a molecular weight of 5 kDa, each X is lysine, each Y is cysteine, each L is a linking group with the formula:

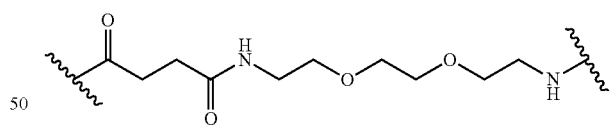

and each $R^1$ is cholic acid.

In some embodiments, the nanoparticles of the present invention are crosslinked via the thiol containing crosslinking groups of formula (II). In some examples, the thiol containing crosslinking group is cysteine or N-acetyl-cysteine. In some examples, the thiol containing crosslinking group is cysteine.

In some examples, the nanoparticles of the present invention comprises conjugates of formula (I) and formula (II) in a ratio (w/w) of about 100:1 to 1:100, about 50:1 to 1:50, about 25:1 to 1:25, about 10:1 to about 1:10, or about 1:1. In some examples, the conjugates of formula (I) to formula (II) have a ratio (w/w) of about 100:1, 50:1, 25:1, 10:1, or 1:1. In some embodiments, the conjugates of formula (I) and formula (II) are in a ratio of about 1:1 (w/w).

In some examples, the mean diameter of the nanoparticle is about 250 nm, about 100 nm, about 50 nm, or about 20 nm. In some embodiments, the mean diameter of the nanoparticle is about 20 nm.

In some embodiments, the nanoparticle of the present invention further comprises a therapeutic drug in the hydrophobic core. The therapeutic drug may have low water solubility. In some examples, the therapeutic drug is selected from the group consisting of bortezomib, paclitaxel, SN38, camptothecin, etoposide and doxorubicin, docetaxel, VP16, prednisone, dexamethasone, vincristine, vinblastine, temsirolimus, carmusine, gardiquimod, doxorubicin, daunorubicin, vincristine, vinblastine, paclitaxel, SN-38, imiquimod, resiquimod, motolimod, lenalidomide, pomalidomide, and LLS30 having the structure (S2):

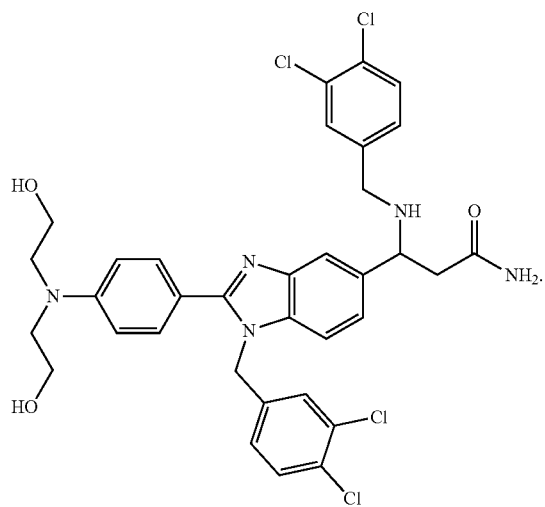

In some embodiments, the therapeutic drug is selected from the group consisting of gardiquimod, doxorubicin, daunorubicin, vincristine, vinblastine, paclitaxel, SN-38, imiquimod, resiquimod, motolimod, lenalidomide, pomalidomide, and LLS30 having the structure (S2).

IV. Methods of Treatment

The nanoparticles of the present invention can be used for treating a disease. The nanoparticles of the present invention can be used for treating a disease via photothermal therapy. The nanoparticles of the present invention can also be used for treating a subject suffering from a diseased tissue. The nanoparticles of the present invention can also be used for imaging, by sequestering an imaging agent in the interior of the nanocarrier, or by attaching the imaging agent to a conjugate of the nanocarrier.

In some embodiments, the present invention provides a method of treating a disease, the method comprising administering a therapeutically effective amount of a nanoparticle of the present invention, to a subject in need thereof.

The nanoparticles of the present invention can be administered to a subject for treatment, of diseases including cancer such as, but not limited to: carcinomas, gliomas, mesotheliomas, melanomas, lymphomas, leukemias, adenocarcinomas, breast cancer, ovarian cancer, cervical cancer, glioblastoma, leukemia, lymphoma, prostate cancer, and Burkitt's lymphoma, head and neck cancer, colon cancer, colorectal cancer, non-small cell lung cancer, small cell lung cancer, cancer of the esophagus, stomach cancer, pancreatic cancer, hepatobiliary cancer, cancer of the gallbladder, cancer of the small intestine, rectal cancer, kidney cancer, bladder cancer, prostate cancer, penile cancer, urethral cancer, testicular cancer, cervical cancer, vaginal cancer, uterine cancer, ovarian cancer, thyroid cancer, parathyroid cancer, adrenal cancer, pancreatic endocrine cancer, carcinoid cancer, bone cancer, skin cancer, retinoblastomas, multiple myelomas, Hodgkin's lymphoma, and non-Hodgkin's lymphoma (see, CANCER: PRINCIPLES AND PRACTICE (DeVita, V. T. et al. eds 2008) for additional cancers).

Other diseases that can be treated by the nanocarriers of the present invention include: (I) inflammatory or allergic diseases such as systemic anaphylaxis or hypersensitivity responses, drug allergies, insect sting allergies; inflammatory bowel diseases, such as Crohn's disease, ulcerative colitis, ileitis and enteritis; vaginitis; psoriasis and inflammatory dermatoses such as dermatitis, eczema, atopic dermatitis, allergic contact dermatitis, urticaria; vasculitis; spondyloarthropathies; scleroderma; respiratory allergic diseases such as asthma, allergic rhinitis, hypersensitivity lung diseases, and the like, (2) autoimmune diseases, such as arthritis (rheumatoid and psoriatic), osteoarthritis, multiple sclerosis, systemic lupus erythematosus, diabetes mellitus, glomerulonephritis, and the like, (3) graft rejection (including allograft rejection and graft-v-host disease), and (4) other diseases in which undesired inflammatory responses are to be inhibited (e.g., atherosclerosis, myositis, neurological conditions such as stroke and closed-head injuries, neurodegenerative diseases, Alzheimer's disease, encephalitis, meningitis, osteoporosis, gout, hepatitis, nephritis, sepsis, sarcoidosis, conjunctivitis, otitis, chronic obstructive pulmonary disease, sinusitis and Behcet's syndrome).

In some embodiments, the present invention provides a method of treating a disease, wherein the disease is cancer. In some embodiments, the disease is breast cancer, oral cancer, cervical cancer, ovarian cancer, pancreatic cancer, lung cancer, bladder cancer, brain cancer, melanoma, myeloma, leukemia, colon cancer, prostate cancer, esophageal cancer, liver cancer, head and neck cancer, lymphoma or metastatic cancer.

In some embodiments, the present invention provides a method of treating a disease, further comprising a therapeutic drug in the hydrophobic core. Suitable therapeutic drugs for the methods of the present invention are described above herein. In some embodiments, the method of treating a disease comprises a therapeutic drug selected from the group consisting of doxorubicin, gardiquimod, and imiquimod. In some embodiments, the method of treating a disease comprises a therapeutic drug, wherein the therapeutic drug is imiquimod, further comprising administering a check point blockade antibody.

Check point blockade antibodies useful in the present invention includes, but is not limited to anti-PD-1, anti-PDL1, anti-CLTA-4, nivolumab, pembrolizumab, keytruda, spartalizumab, atezolizumab, and ipilimumab. In some embodiments, the check point blockade antibody useful in the present invention is anti-PD-1, anti-PDL1, or anti-CTLA-4. In some embodiments, the check point blockade antibody is anti-PD-1.

In some embodiments, the present invention provides a method of treating a disease via photothermal therapy, the method comprising administering a therapeutically effective amount of a nanoparticle of the present invention, to a subject in need thereof, and exposing the subject to radiation, thereby treating the disease via photothermal therapy.

The methods of treating using the nanocarriers of the present invention also includes treating a disease by photothermal therapy. The methods generally involve administering a nanocarrier of the present invention to a subject, and then exposing the subject to radiation of a specific wavelength to induce the photodynamic or photothermal therapy depending on the wavelength of light. Upon exposure to the radiation or light, the nanoparticles generate heat sufficient for photothermal therapy. In some embodiments, the present invention provides a method of treating a disease via photothermal therapy, including administering to a subject in need thereof, a therapeutically effective amount of a nanocarrier of the present invention, and exposing the subject to radiation, thereby treating the disease via photothermal therapy. In some embodiments, the method is a method of treating a disease via photothermal therapy.

Radiation useful in the present methods include electromagnetic radiation, particle radiation, acoustic radiation, and gravitational radiation. Examples of electromagnetic radiation includes, but is not limited to radio waves, microwaves, infrared light, visible light, ultraviolet light, x-rays, and gamma radiation.

In some embodiments, the present invention provides a method of treating the disease via photothermal therapy, wherein the subject is exposed to electromagnetic radiation. In some embodiments, the present invention provides a method of treating a disease via photothermal therapy, wherein the subject is exposed to near infra-red light irradiation.

The nanoparticles of the present invention can be administered to a subject for treatment of diseases via photothermal therapy, wherein the diseases are as described above herein.

In some embodiments, the present invention provides a method of treating a disease via photothermal therapy, wherein the disease is cancer. In some embodiments, the disease is breast cancer, oral cancer, cervical cancer, ovarian cancer, pancreatic cancer, lung cancer, bladder cancer, brain cancer, melanoma, myeloma, leukemia, colon cancer, prostate cancer, esophageal cancer, liver cancer, head and neck cancer, lymphoma or metastatic cancer.

In some embodiments, the present invention provides a method of treating a disease via photothermal therapy, further comprising a therapeutic drug in the hydrophobic core. Suitable therapeutic drugs for the methods of the present invention are described above herein. In some embodiments, the method of treating a disease comprises a therapeutic drug selected from the group consisting of doxorubicin, gardiquimod, and imiquimod. In some embodiments, the method of treating a disease comprises a therapeutic drug, wherein the therapeutic drug is imiquimod, further comprising administering anti-PD-1 via injection.

In some embodiments, the present invention provides a method of treating a subject suffering from a diseased tissue, the method comprising: administering an effective amount of nanoparticles of the present invention, to the subject such that the nanoparticles concentrate in the diseased tissue; irradiating at a first wavelength the diseased tissue to identify the diseased tissue; and removing the diseased tissue from the subject, thereby treating the subject.

In some embodiments, the present invention provides a method of treating a subject suffering from a diseased tissue wherein the method further comprises delaying the irradiation step at least 1 hour following the administering step, at least 2 hours following the administering step, at least 3 hours following the administering step, at least 4 hours following the irradiation step, at least 5 hours following the irradiation step, or at least 6 hours following the irradiation step. In some embodiments, the present invention provides a method of treating a subject suffering from a diseased tissue wherein the method further comprises delaying the irradiation step at least 3 hours following the administering step.

In some embodiments, the present invention provides a method of treating a subject suffering from a diseased tissue wherein the method further comprises irradiating at a second wavelength any remaining diseased tissue in the subject. In some embodiments, the present invention provides a method of treating a subject suffering from a diseased tissue wherein the removing and both irradiating steps are performed during a single operation on the subject.

In some embodiments, the present invention provides a method of treating a subject suffering from a diseased tissue wherein the first and second wavelengths are each independently in the ultraviolet spectrum, visible light spectrum, or infra-red spectrum. In some embodiments, the present invention provides a method of treating a subject suffering from a diseased tissue wherein the first and second wavelengths are each independently in the extreme ultraviolet spectrum, near ultraviolet spectrum, near infra-red spectrum, mid infra-red spectrum, or far infra-red spectrum. In some embodiments, the present invention provides a method of treating a subject suffering from a diseased tissue wherein the first and second wavelengths are in the near infra-red spectrum.

In some embodiments, the present invention provides a method of treating a subject suffering from a diseased tissue wherein the diseased tissue is any suitable diseased tissue from diseases described above herein. In some embodiments, the present invention provides a method of treating a subject suffering from a diseased tissue wherein the diseased tissue is cancer. In some embodiments, the diseased tissue is breast cancer, oral cancer, cervical cancer, ovarian cancer, pancreatic cancer, lung cancer, bladder cancer, brain cancer, melanoma, myeloma, leukemia, colon cancer, prostate cancer, esophageal cancer, liver cancer, head and neck cancer, lymphoma or metastatic cancer. In some embodiments, the present invention provides a method of treating a subject suffering from a diseased tissue wherein the diseased tissue is ovarian cancer.

In some embodiments, the present invention provides a method of imaging, the method comprising: administering an effective amount of nanoparticles of the present invention, to a subject in need thereof; and imaging the subject. In some embodiments, the nanoparticle may further comprise an imaging agent in the hydrophobic core.

Exemplary imaging agents include paramagnetic agents, optical probes, and radionuclides. Paramagnetic agents imaging agents that are magnetic under an externally applied field. Examples of paramagnetic agents include, but are not limited to, iron particles including nanoparticles. Optical probes are fluorescent compounds that can be detected by excitation at one wavelength of radiation and detection at a second, different, wavelength of radiation. Optical probes useful in the present invention include, but are not limited to, Cy5.5, Alexa 680, Cy5, DiD (1,1'-dioctadecyl-3,3,3',3'-tetramethylindodicarbocyanine perchlorate) and DiR (1,1'-dioctadecyl-3,3,3',3'-tetramethylindotricarbocyanine iodide). Other optical probes include quantum dots. Radionuclides are elements that undergo radioactive decay. Radionuclides useful in the present invention include, but are not limited to, $^{3}H$, $^{11}C$, $^{13}N$, $^{18}F$, $^{19}F$, $^{60}Co$, $^{64}Cu$, $^{67}Cu$, $^{68}Ga$, $^{82}$Rb, $^{90}$Sr, $^{90}$Y, $^{99}$Tc, $^{99m}$Tc, $^{111}$In, $^{123}$I, $^{124}$I, $^{125}$I, $^{129}$I, $^{131}$I, $^{137}$Cs, $^{177}$Lu, $^{186}$Re, $^{188}$Re, $^{211}$At, Rn, Ra, Th, U, Pu and $^{241}$Am.

V. Method of Preparing Nanoparticles

In some embodiments, the present invention provides a method of preparing a nanoparticle of the present invention, comprising: forming a reaction mixture comprising a plurality of first conjugates of formula (I) as described herein, wherein the conjugates self-assemble to form nanoparticles such that a hydrophobic core is formed in the interior of the nanoparticle, wherein the PEG of each conjugate self-assembles on the exterior of the nanoparticle.

In some embodiments, the present invention provides a method of preparing a nanoparticle of the present invention further comprising a plurality of second conjugates of formula (II) as described herein.

In some embodiments, the present invention provides a method of preparing a nanoparticle of the present invention wherein the aqueous solution is a buffer solution. The buffer solution can comprise any combination of buffering agents, which include but are not limited to citric acid, acetic acid KH$_2$PO$_4$, CHES, borate, TAPS, Bicine, Tris, Tricine, TAPS, HEPES, TES, MOPS, PIPES, Cacodylate, and MES. In some embodiments, the aqueous solution comprises PBS.

In some embodiments, the present invention provides a method of preparing a nanoparticle of the present invention wherein the method further comprising sonicating the reaction mixture. The reaction mixture can be sonicated for about 5 minutes, about 10 minutes, about 20 minutes, about 30 minutes, or about 1 hour. In some embodiments, the reaction mixture can be sonicated for about 10 minutes.

In some embodiments, the present invention provides a method of preparing a nanoparticle of the present invention wherein the aqueous solution is PBS and the method further comprises sonicating the reaction mixture for about 10 minutes.

In some examples, the present invention provides a method of preparing a nanoparticle of the present invention wherein the nanoparticle comprises conjugates of formula (I) and formula (II) in a ratio (w/w) of about 100:1 to 1:100, about 50:1 to 1:50, about 25:1 to 1:25, about 10:1 to about 1:10, or about 1:1. In some examples, the conjugates of formula (I) to formula (II) have a ratio (w/w) of about 100:1, 50:1, 25:1, 10:1, or 1:1. In some embodiments, the conjugates of formula (I) and formula (II) are in a ratio of about 1:1 (w/w).

In some embodiments, the present invention provides a method of preparing a nanoparticle wherein the nanoparticles further comprises a plurality of second conjugates of formula (II), wherein the thiol containing crosslinking group is cysteine or N-acetyl-cysteine. In some examples, the thiol containing crosslinking group is cysteine. In some embodiments, a crosslinking bonds are formed via the oxidation of cysteine.

VI. Formulation & Pharmaceutical Composition

The compositions of the present invention can be prepared in a wide variety of oral, parenteral and topical dosage forms. Oral preparations include tablets, pills, powder, dragees, capsules, liquids, lozenges, cachets, gels, syrups, slurries, suspensions, etc., suitable for ingestion by the patient. The compositions of the present invention can also be administered by injection, that is, intravenously, intramuscularly, intracutaneously, subcutaneously, intraduodenally, or intraperitoneally. Also, the compositions described herein can be administered by inhalation, for example, intranasally. Additionally, the compositions of the present invention can be administered transdermally. The compositions of this invention can also be administered by intraocular, intravaginal, and intrarectal routes including suppositories, insufflation, powders and aerosol formulations (for examples of steroid inhalants, see Rohatagi, *J. Clin. Pharmacol.* 35:1187-1193, 1995; Tjwa, *Ann. Allergy Asthma Immunol.* 75:107-111, 1995). Accordingly, the present invention also provides pharmaceutical compositions including a pharmaceutically acceptable carrier or excipient and the compositions of the present invention.

For preparing pharmaceutical compositions from the compounds of the present invention, pharmaceutically acceptable carriers can be either solid or liquid. Solid form preparations include powders, tablets, pills, capsules, cachets, suppositories, and dispersible granules. A solid carrier can be one or more substances, which may also act as diluents, flavoring agents, binders, preservatives, tablet disintegrating agents, or an encapsulating material. Details on techniques for formulation and administration are well described in the scientific and patent literature, see, e.g., the latest edition of Remington's Pharmaceutical Sciences, Maack Publishing Co, Easton PA ("Remington's").

In powders, the carrier is a finely divided solid, which is in a mixture with the finely divided active component. In tablets, the active component is mixed with the carrier having the necessary binding properties in suitable proportions and compacted in the shape and size desired. The powders and tablets preferably contain from 5% or 10% to 70% of compositions of the present invention.

Suitable solid excipients include, but are not limited to, magnesium carbonate; magnesium stearate; talc; pectin; dextrin; starch; tragacanth; a low melting wax; cocoa butter; carbohydrates; sugars including, but not limited to, lactose, sucrose, mannitol, or sorbitol, starch from corn, wheat, rice, potato, or other plants; cellulose such as methyl cellulose, hydroxypropylmethyl-cellulose, or sodium carboxymethyl-cellulose; and gums including arabic and tragacanth; as well as proteins including, but not limited to, gelatin and collagen. If desired, disintegrating or solubilizing agents may be added, such as the cross-linked polyvinyl pyrrolidone, agar, alginic acid, or a salt thereof, such as sodium alginate.

Dragee cores are provided with suitable coatings such as concentrated sugar solutions, which may also contain gum arabic, talc, polyvinylpyrrolidone, carbopol gel, polyethylene glycol, and/or titanium dioxide, lacquer solutions, and suitable organic solvents or solvent mixtures. Dyestuffs or pigments may be added to the tablets or dragee coatings for product identification or to characterize the quantity of active compound (i.e., dosage). Pharmaceutical preparations of the invention can also be used orally using, for example, push-fit capsules made of gelatin, as well as soft, sealed capsules made of gelatin and a coating such as glycerol or sorbitol. Push-fit capsules can contain compounds of the present invention mixed with a filler or binders such as lactose or starches, lubricants such as talc or magnesium stearate, and, optionally, stabilizers. In soft capsules, the compositions of the present invention may be dissolved or suspended in suitable liquids, such as fatty oils, liquid paraffin, or liquid polyethylene glycol with or without stabilizers.

For preparing suppositories, a low melting wax, such as a mixture of fatty acid glycerides or cocoa butter, is first melted and the compositions of the present invention are dispersed homogeneously therein, as by stirring. The molten homogeneous mixture is then poured into convenient sized molds, allowed to cool, and thereby to solidify.

Liquid form preparations include solutions, suspensions, and emulsions, for example, water or water/propylene glycol solutions. For parenteral injection, liquid preparations can be formulated in solution in aqueous polyethylene glycol solution.

Aqueous solutions suitable for oral use can be prepared by dissolving the compositions of the present invention in water and adding suitable colorants, flavors, stabilizers, and thickening agents as desired. Aqueous suspensions suitable for oral use can be made by dispersing the finely divided active component in water with viscous material, such as natural or synthetic gums, resins, methylcellulose, sodium carboxymethylcellulose, hydroxypropylmethylcellulose, sodium alginate, polyvinylpyrrolidone, gum tragacanth and gum acacia, and dispersing or wetting agents such as a naturally occurring phosphatide (e.g., lecithin), a condensation product of an alkylene oxide with a fatty acid (e.g., polyoxyethylene stearate), a condensation product of ethylene oxide with a long chain aliphatic alcohol (e.g., heptadecaethylene oxycetanol), a condensation product of ethylene oxide with a partial ester derived from a fatty acid and a hexitol (e.g., polyoxyethylene sorbitol mono-oleate), or a condensation product of ethylene oxide with a partial ester derived from fatty acid and a hexitol anhydride (e.g., polyoxyethylene sorbitan mono-oleate). The aqueous suspension can also contain one or more preservatives such as ethyl or n-propyl p-hydroxybenzoate, one or more coloring agents, one or more flavoring agents and one or more sweetening agents, such as sucrose, aspartame or saccharin. Formulations can be adjusted for osmolarity.

Also included are solid form preparations, which are intended to be converted, shortly before use, to liquid form preparations for oral administration. Such liquid forms include solutions, suspensions, and emulsions. These preparations may contain, in addition to the active component, colorants, flavors, stabilizers, buffers, artificial and natural sweeteners, dispersants, thickeners, solubilizing agents, and the like.

Oil suspensions can be formulated by suspending the compounds of the present invention in a vegetable oil, such as arachis oil, olive oil, sesame oil or coconut oil, or in a mineral oil such as liquid paraffin; or a mixture of these. The oil suspensions can contain a thickening agent, such as beeswax, hard paraffin or cetyl alcohol. Sweetening agents can be added to provide a palatable oral preparation, such as glycerol, sorbitol or sucrose. These formulations can be preserved by the addition of an antioxidant such as ascorbic acid. As an example of an injectable oil vehicle, see Minto, J Pharmacol. Exp. Ther. 281:93-102, 1997. The pharmaceutical formulations of the invention can also be in the form of oil-in-water emulsions. The oily phase can be a vegetable oil or a mineral oil, described above, or a mixture of these. Suitable emulsifying agents include naturally-occurring gums, such as gum acacia and gum tragacanth, naturally occurring phosphatides, such as soybean lecithin, esters or partial esters derived from fatty acids and hexitol anhydrides, such as sorbitan mono-oleate, and condensation products of these partial esters with ethylene oxide, such as polyoxyethylene sorbitan mono-oleate. The emulsion can also contain sweetening agents and flavoring agents, as in the formulation of syrups and elixirs. Such formulations can also contain a demulcent, a preservative, or a coloring agent.

The compositions of the present invention can also be delivered as microspheres for slow release in the body. For example, microspheres can be formulated for administration via intradermal injection of drug-containing microspheres, which slowly release subcutaneously (see Rao, J. Biomater Sci. Polym. Ed. 7:623-645, 1995; as biodegradable and injectable gel formulations (see, e.g., Gao Pharm. Res. 12:857-863, 1995); or, as microspheres for oral administration (see, e.g., Eyles, J. Pharm. Pharmacol. 49:669-674, 1997). Both transdermal and intradermal routes afford constant delivery for weeks or months.

In some embodiments, the compositions of the present invention can be formulated for parenteral administration, such as intravenous (IV) administration or administration into a body cavity or lumen of an organ. The formulations for administration will commonly comprise a solution of the compositions of the present invention dissolved in a pharmaceutically acceptable carrier. Among the acceptable vehicles and solvents that can be employed are water and Ringer's solution, an isotonic sodium chloride. In addition, sterile fixed oils can conventionally be employed as a solvent or suspending medium. For this purpose any bland fixed oil can be employed including synthetic mono- or diglycerides. In addition, fatty acids such as oleic acid can likewise be used in the preparation of injectables. These solutions are sterile and generally free of undesirable matter. These formulations may be sterilized by conventional, well known sterilization techniques. The formulations may contain pharmaceutically acceptable auxiliary substances as required to approximate physiological conditions such as pH adjusting and buffering agents, toxicity adjusting agents, e.g., sodium acetate, sodium chloride, potassium chloride, calcium chloride, sodium lactate and the like. The concentration of the compositions of the present invention in these formulations can vary widely, and will be selected primarily based on fluid volumes, viscosities, body weight, and the like, in accordance with the particular mode of administration selected and the patient's needs. For IV administration, the formulation can be a sterile injectable preparation, such as a sterile injectable aqueous or oleaginous suspension. This suspension can be formulated according to the known art using those suitable dispersing or wetting agents and suspending agents. The sterile injectable preparation can also be a sterile injectable solution or suspension in a nontoxic parenterally-acceptable diluent or solvent, such as a solution of 1,3-butanediol.

In some embodiments, the formulations of the compositions of the present invention can be delivered by the use of liposomes which fuse with the cellular membrane or are endocytosed, i.e., by employing ligands attached to the liposome, or attached directly to the oligonucleotide, that bind to surface membrane protein receptors of the cell resulting in endocytosis. By using liposomes, particularly where the liposome surface carries ligands specific for target cells, or are otherwise preferentially directed to a specific organ, one can focus the delivery of the compositions of the present invention into the target cells in vivo. (See, e.g., Al-Muhammed, J. Microencapsul. 13:293-306, 1996; Chonn, Curr. Opin. Biotechnol. 6:698-708, 1995; Ostro, Am. J. Hosp. Pharm. 46:1576-1587, 1989).

VII. Administration

The compositions of the present invention can be delivered by any suitable means, including oral, parenteral and topical methods. Transdermal administration methods, by a topical route, can be formulated as applicator sticks, solutions, suspensions, emulsions, gels, creams, ointments, pastes, jellies, paints, powders, and aerosols.

The pharmaceutical preparation is preferably in unit dosage form. In such form the preparation is subdivided into unit doses containing appropriate quantities of the composition of the present invention. The unit dosage form can be a packaged preparation, the package containing discrete quantities of preparation, such as packeted tablets, capsules, and powders in vials or ampoules. Also, the unit dosage form can be a capsule, tablet, cachet, or lozenge itself, or it can be the appropriate number of any of these in packaged form.

The compound of the present invention can be present in any suitable amount, and can depend on various factors including, but not limited to, weight and age of the subject, state of the disease, etc. Suitable dosage ranges for the compound of the present invention include from about 0.1 mg to about 10,000 mg, or about 1 mg to about 1000 mg, or about 10 mg to about 750 mg, or about 25 mg to about 500 mg, or about 50 mg to about 250 mg. Suitable dosages for the compound of the present invention include about 1 mg, 5, 10, 20, 30, 40, 50, 60, 70, 80, 90, 100, 200, 300, 400, 500, 600, 700, 800, 900 or 1000 mg.

The compounds of the present invention can be administered at any suitable frequency, interval and duration. For example, the compound of the present invention can be administered once an hour, or two, three or more times an hour, once a day, or two, three, or more times per day, or once every 2, 3, 4, 5, 6, or 7 days, so as to provide the preferred dosage level. When the compound of the present invention is administered more than once a day, representative intervals include 5, 10, 15, 20, 30, 45 and 60 minutes, as well as 1, 2, 4, 6, 8, 10, 12, 16, 20, and 24 hours. The compound of the present invention can be administered once, twice, or three or more times, for an hour, for 1 to 6 hours, for 1 to 12 hours, for 1 to 24 hours, for 6 to 12 hours, for 12 to 24 hours, for a single day, for 1 to 7 days, for a single week, for 1 to 4 weeks, for a month, for 1 to 12 months, for a year or more, or even indefinitely.

The composition can also contain other compatible therapeutic agents. The compounds described herein can be used in combination with one another, with other active agents, or with adjunctive agents that may not be effective alone, but may contribute to the efficacy of the active agent.

The compounds of the present invention can be co-administered with another active agent. Co-administration includes administering the compound of the present invention and active agent within 0.5, 1, 2, 4, 6, 8, 10, 12, 16, 20, or 24 hours of each other. Co-administration also includes administering the compound of the present invention and active agent simultaneously, approximately simultaneously (e.g., within about 1, 5, 10, 15, 20, or 30 minutes of each other), or sequentially in any order. Moreover, the compound of the present invention and the active agent can each be administered once a day, or two, three, or more times per day so as to provide the preferred dosage level per day.

In some embodiments, co-administration can be accomplished by co-formulation, i.e., preparing a single pharmaceutical composition including both the compound of the present invention and the active agent. In some embodiments, the compound of the present invention and the active agent can be formulated separately.

The compound of the present invention and the active agent can be present in the compositions of the present invention in any suitable weight ratio, such as from about 1:100 to about 100:1 (w/w), or about 1:50 to about 50:1, or about 1:25 to about 25:1, or about 1:10 to about 10:1, or about 1:5 to about 5:1 (w/w). The compound of the present invention and the other active agent can be present in any suitable weight ratio, such as about 1:100 (w/w), 1:50, 1:25, 1:10, 1:5, 1:4, 1:3, 1:2, 1:1, 2:1, 3:1, 4:1, 5:1, 10:1, 25:1, 50:1 or 100:1 (w/w). Other dosages and dosage ratios of the compound of the present invention and the active agent are suitable in the compositions and methods of the present invention.

VIII. Examples

Results

Figure 2:
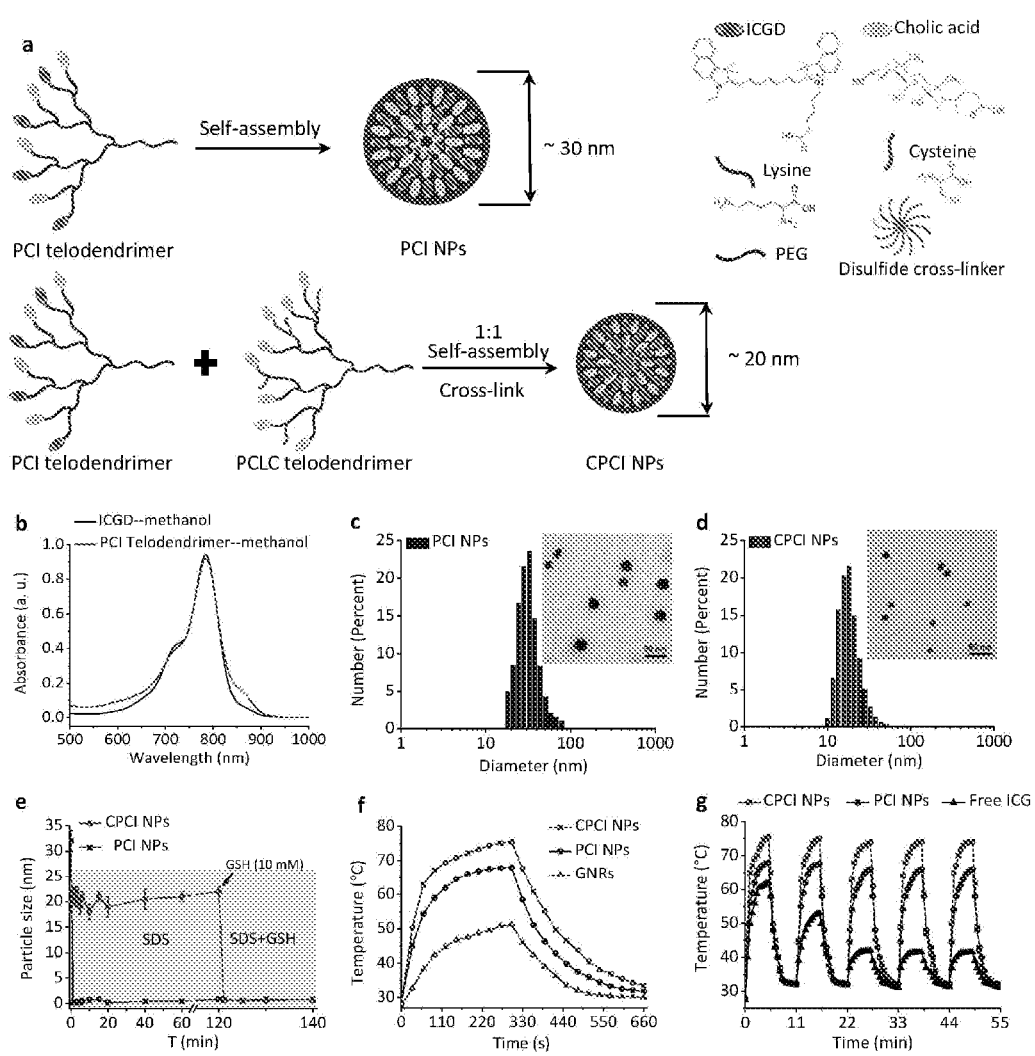
FIG. 2 shows design and characterizations of PCI NPs and CPCI NPs. (a) Schematic illustration of self-assemble of PCI NPs and CPCI NPs. (b) UV-vis-NIR absorption spectra of ICGD molecule and PCI telodendrimer in methanol. DLS and TEM imaging of (c) PCI NPs and (d) CPCI NPs PBS solution (stained with phosphotungstic acid; telodendrimer concentration: 1 mg mL$^{-1}$). (e) Continuous dynamic light scattering measurements of PCI NPs and CPCI NPs in SDS for 120 min, after which GSH (10 mM) was added. (f) Comparison of the photothermal conversion behavior of CPCI NPs, PCI NPs, and GNRs under laser irradiation at 808 nm for 300 s (ICGD concentration: 30 μg mL$^{-1}$, GNRs concentration: 18 μg mL$^{-1}$). (g) Antiphotobleaching property of CPCI NPs, PCI NPs, and ICG in PBS solution during five circles of heating-cooling processes (ICGD and ICG concentration: 30 μg mL$^{-1}$).
Figure 9:
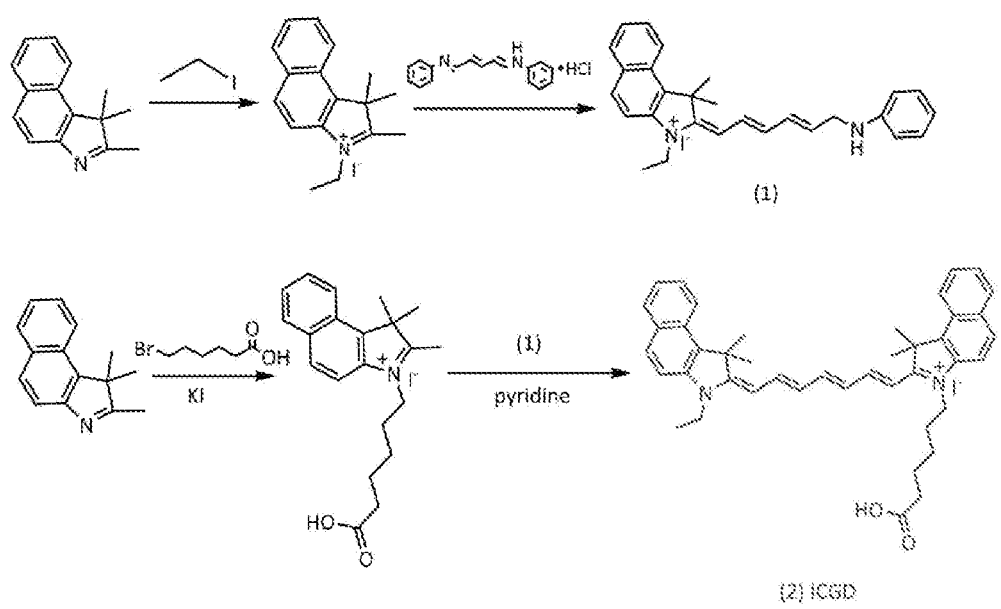
FIG. 9 shows synthetic approach of ICGD via multi steps chemical reaction.
Figure 10:
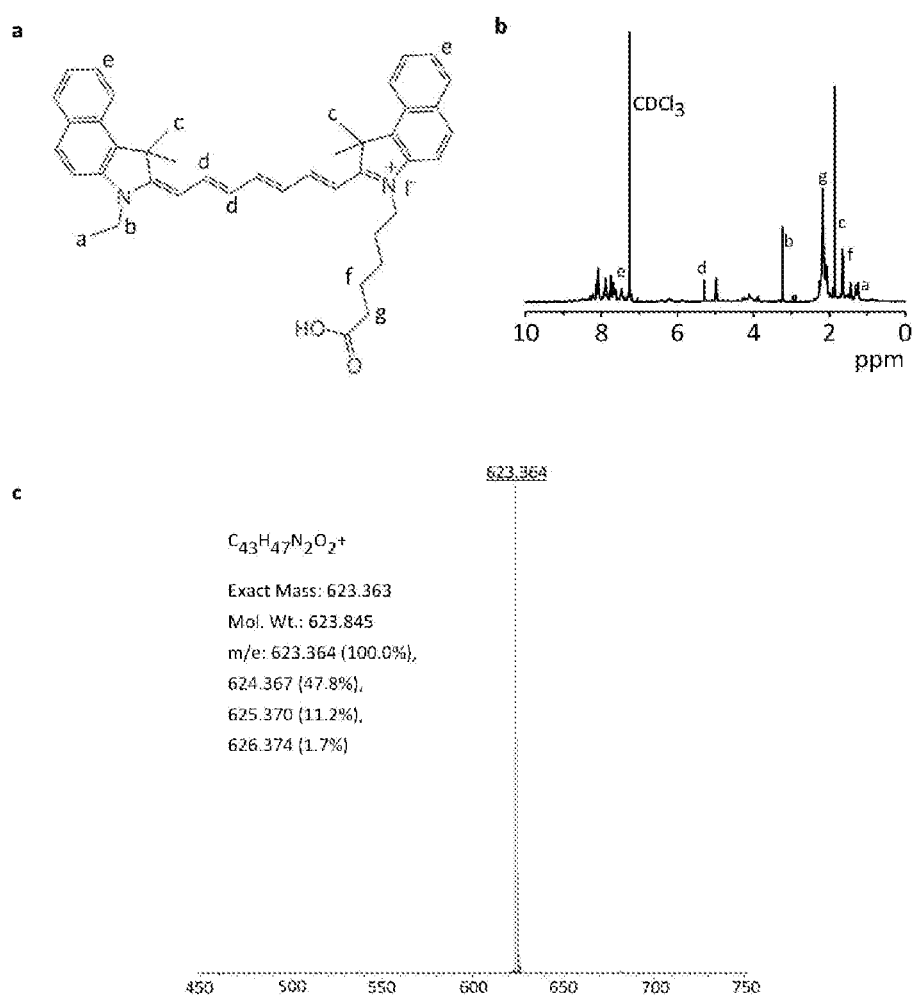
FIG. 10 shows characterization of ICGD molecule: (a) chemical structure, (b) $^1$H NMR spectra in CDCl3, (c) mass spectra of ICGD molecule via ESI mass spectrometry measurements.
Figure 11:
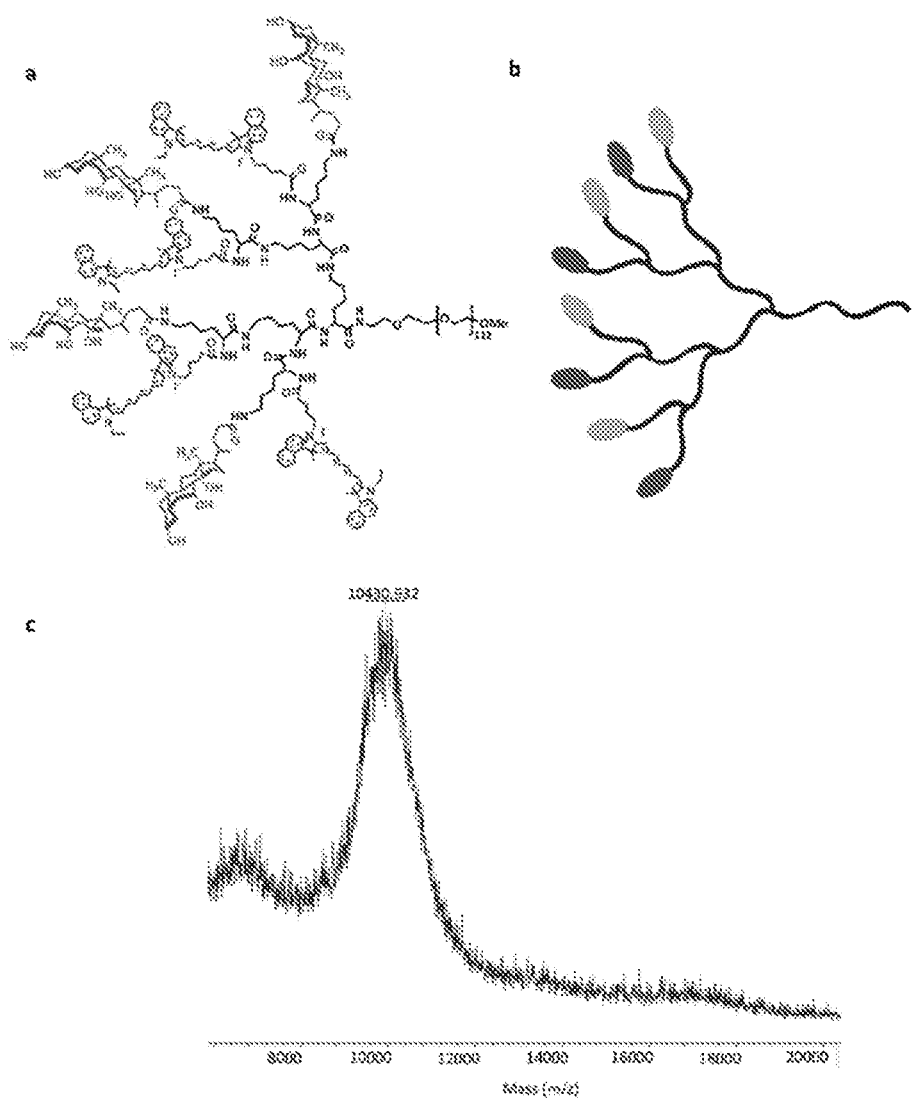
FIG. 11 shows characterization of PCI telodendrimer: (a) chemical structure, (b) schematic illustration, (c) mass spectra of PCI telodendrimer via MALDI-TOF mass spectrometry measurements.
Figure 13:
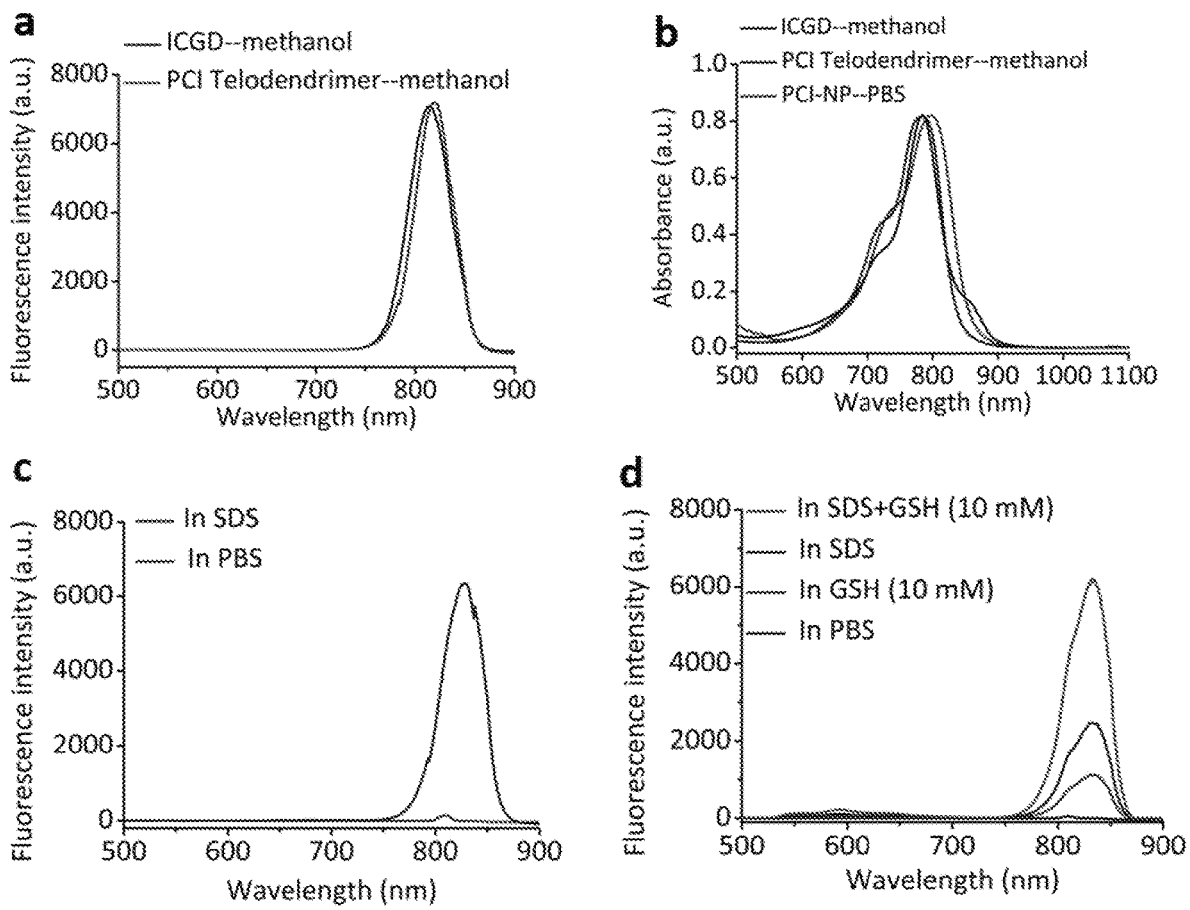
FIG. 13 shows (a) Fluorescence spectra of ICGD and PCI telodendrimer in methanol. (b) UV-vis-NIR absorption spectra of ICGD and PCI telodendrimer in methanol and PCI NPs in PBS (ICGD concentration: 30 μg mL$^{-1}$). (c) Fluorescence spectra of ICGD from PCI NPs in PBS and SDS (PCI telodendrimer concentration: 0.1 mg mL$^{-1}$). (d) Fluorescence spectra of ICGD from CPCI NPs in PBS, SDS, GSH and GSH+SDS (PCI telodendrimer concentration: 0.1 mg mL$^{-1}$).

Design and preparation of CPCI-NP. To impart the photothermal feature, the highly stable hydrophobic photothermal conversion agent indocyanine green derivative (ICGD) was first synthesized and introduced into the telodendrimer system (FIG. 9). As shown in FIGS. 10a, 10b and 10c, $^1$H NMR and ESI mass spectrometry measurements verified the chemical structures of ICGD. From the UV-vis absorption spectra, ICGD displayed broad absorption bands from 500 to 900 nm with two absorption peaks in methanol. One shoulder peak was at around 720 nm and another was in the near-infrared range peak at around 785 nm (FIG. 2b). The fluorescence emission spectra with a peak value of 835 nm were obtained in methanol upon excitation at 808-nm. ICGD molecule was functionalized with a carboxylic acid group so that four ICGD units could be easily grafted onto $PEG_{5K}$-$CA_4$-telodendrimer to obtain $PEG_{5K}$-$CA_4$-$ICGD_4$ (PCI) telodendrimer, with molecular weight determined to be 10,430 Da with MALDI-TOF mass spectrometry (FIGS. 11a and 11b). The absorption and fluorescence emission of PCI telodendrimer in methanol were almost identical to that of single ICGD molecule in methanol, indicating the successful introduction of ICGD into PCI (FIG. 2b, FIG. 13a).

Amphiphilic PCI telodendrimer could self-assemble into thermodynamically stable nanoparticles (PCI-NP) with uniform size (~30 nm) which was simultaneously verified via dynamic light scattering (DLS) and transmission electron micrograph (TEM) image (FIG. 2c). Given the π-π interactions and intense hydrophobicity, ICGD and CA could easily self-assembled into highly ordered structure to form hydrophobic core of PCI-NP. As shown in FIG. 13b, the UV-vis absorption of PCI-NP in PBS was broader and slightly red-shifted comparing with that of PCI telodendrimer in methanol, indicating the self-assembly of ICGD. Meanwhile, the fluorescence intensity of ICGD in PCI-NP in PBS solution was found to be very weak (Ex: 808 nm), probably ascribing to the aggregation-caused quenching effect, which further revealed that ICGD self-assembled into highly-ordered structures. This interpretation was further validated by the recovery of the fluorescence upon micelle dissociation. When a strong ionic detergent sodium dodecyl sulfate (SDS; 2.5 mg mL$^{-1}$ final concentration) was added into PCI-NP PBS solution, PCI-NP disintegrated and the fluorescence intensity of ICGD with a peak value at 835 nm was significantly enhanced (FIG. 13c).

Figure 12:
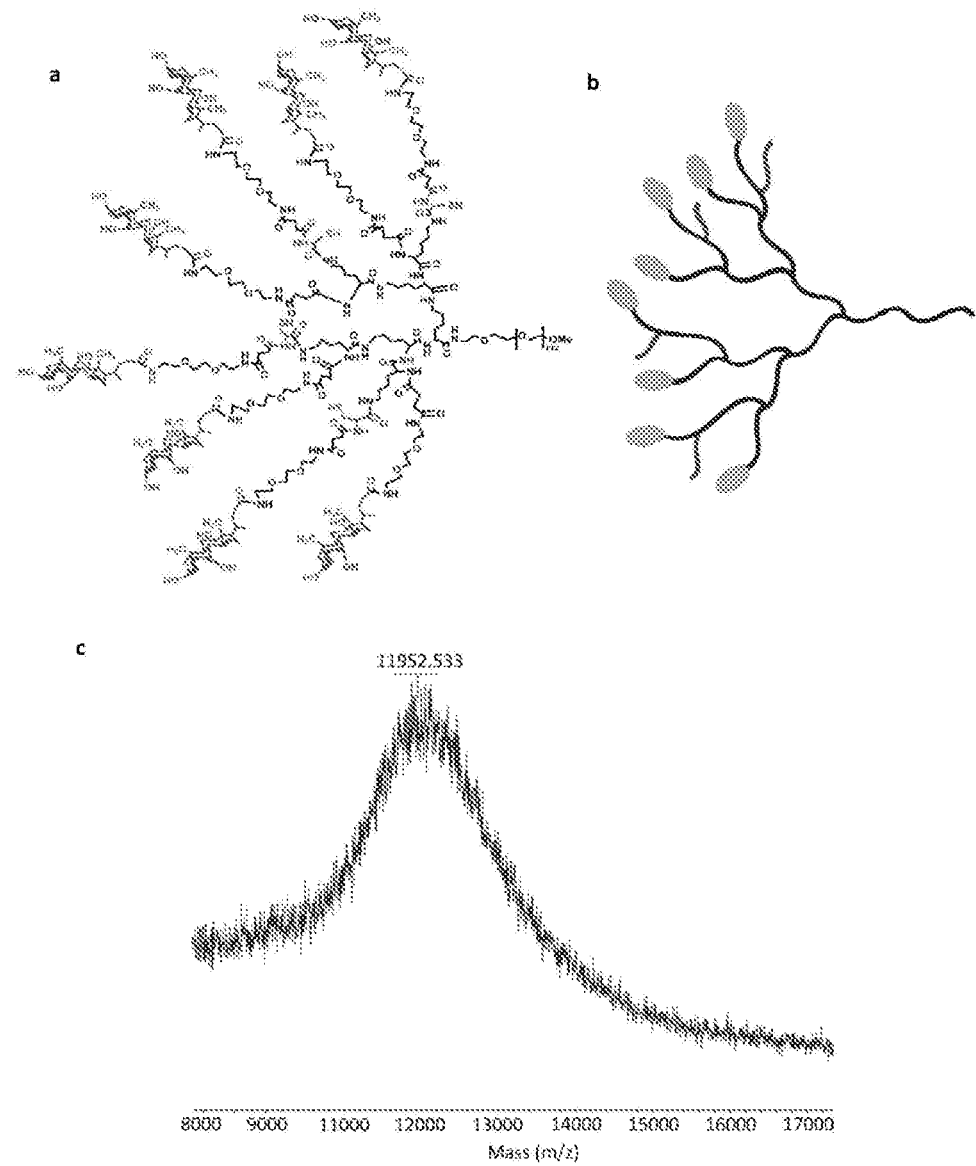
FIG. 12 shows characterization of PCLC telodendrimer: (a) Chemical structure, (b) schematic illustration, (c) mass spectra of PCLC telodendrimer via MALDI-TOF mass spectrometry measurements.

In order to improve the stability of PCI-NP for in vivo studies, hybrid NPs with disulfide cross-linkage were formulated via co-self-assembly of cysteines-containing telodendrimer ($PEG_{5k}$-$Cys_4$-$L_8$-$CA_8$, PCLC) and PCI telodendrimer at a rational weight ratio (1:1), to generate CPCI-NP. As shown in FIGS. 12a and 12b, eight CA and four cysteines units were introduced to the backbone of PCLC telodendrimer (Mn≈12000). Thiol groups on the cysteines could form disulfide bonds inside hydrophobic core of NPs under the oxidation environment, just like bundled ropes which could improve density and stability of NPs. As shown in DLS and TEM image (FIG. 2d), under this compositional design, the size of the CPCI-NP was smaller than that of PCI-NP, i.e. 20±6 nm vs. 30±8 nm. This is a desirable particle size for efficient accumulation inside tumor by an enhanced permeation and retention (EPR) effect. The stability of PCI-NP and CPCI-NP were tested in the presence of NP-disrupting SDS at final concentration of 2.5 mg mL$^{-1}$. As shown in FIG. 2e, the immediate disappearance (<10 s) of particle size signal of PCI-NP reflected the distinct dynamic association-dissociation property of non-cross-linked PCI-NP. In a sharp contrast, CPCI-NP still remained the particle size at around 20 nm in the presence of SDS, indicating high stability of such cross-linked NPs. Furthermore, in the presence of SDS and an intracellular reductive glutathione (GSH) level (~10 mM), particle size signal of CPCI-NP rapidly disappeared, indicating that dissociation of CPCI-NP after cleavage of disulfide bonds by GSH. Similar to PCI-NP, the fluorescence of ICGD (Ex: 808 nm) in CPCI-NP was also highly quenched. The fluorescence intensity of CPCI-NP solution was just slightly increased in SDS solution without GSH or in PBS solution with GSH, because neither GSH (~10 mM) nor SDS (2.5 mg mL$^{-1}$) alone was able to disassemble cross-linked NPs. However, as shown in FIG. 15d, in the presence of both SDS and GSH, the fluorescence intensity of CPCI-NP solution with a peak value at 835 nm was enhanced a 100 fold, compared to the intact micellar form in PBS.

Photothermal properties of CPCI-NP. Photothermal conversion property was evaluated via quantitative measurement of the temperature variations of CPCI-NP and PCI-NP in PBS solution under laser irradiation at 808 nm with the power intensity of 0.8 W cm$^{-2}$; polyethylene glycol (PEG) coated gold nanorods (GNRs) was used as a control. As shown in FIG. 2f, both CPCI-NP and PCI-NP solutions displayed rapid temperature increase in the first 60 s, and the temperature were increased to 64.5° C. for CPCI-NP and 56.6° C. for PCI-NP. After continuous laser irradiation for 300 s, the solution temperatures of both CPCI-NP and PCI-NP reached a plateau, and temperature of CPCI-NP solution (78.5° C.) was about 10.5° C. higher than that of PCI-NP solution with the same concentration of ICGD. The maximum temperature of GNRs (51.2° C.) was similar to that of other gold nanostructures reported previously. According to the previously reported procedure, the photothermal conversion efficiency ($\eta$) of CPCI-NP at 808 nm was calculated to be 30.6%, which is higher than that of PCI-NP (24.3%) and GNRs (18.1%). These results demonstrated that CPCI-NP possessed more efficient photo-thermal conversion than GNRs. Subsequently, the photothermal stability of CPCI-NP and PCI-NP were also studied by alternate heating and cooling of NPs solutions, in comparison with an FDA-approved photothermal agent, indocyanine green (ICG). CPCI-NP was found to maintain a robust photothermal efficiency even after five cycles of 808 nm laser irradiation (FIG. 2g), with a little higher, and much higher stability than that of PCI-NP and ICG PBS solution, respectively. Likewise, CPCI-NP exhibited much higher plateau temperature and faster temperature rising rate comparing to PCI-NP. These high photothermal conversion efficiency and high stability of CPCI-NP could be originated from strong $\pi$-$\pi$ interaction as well as cross-linkage induced dense assembly of ICGD (FIG. 2c, 2d).

Figure 3:
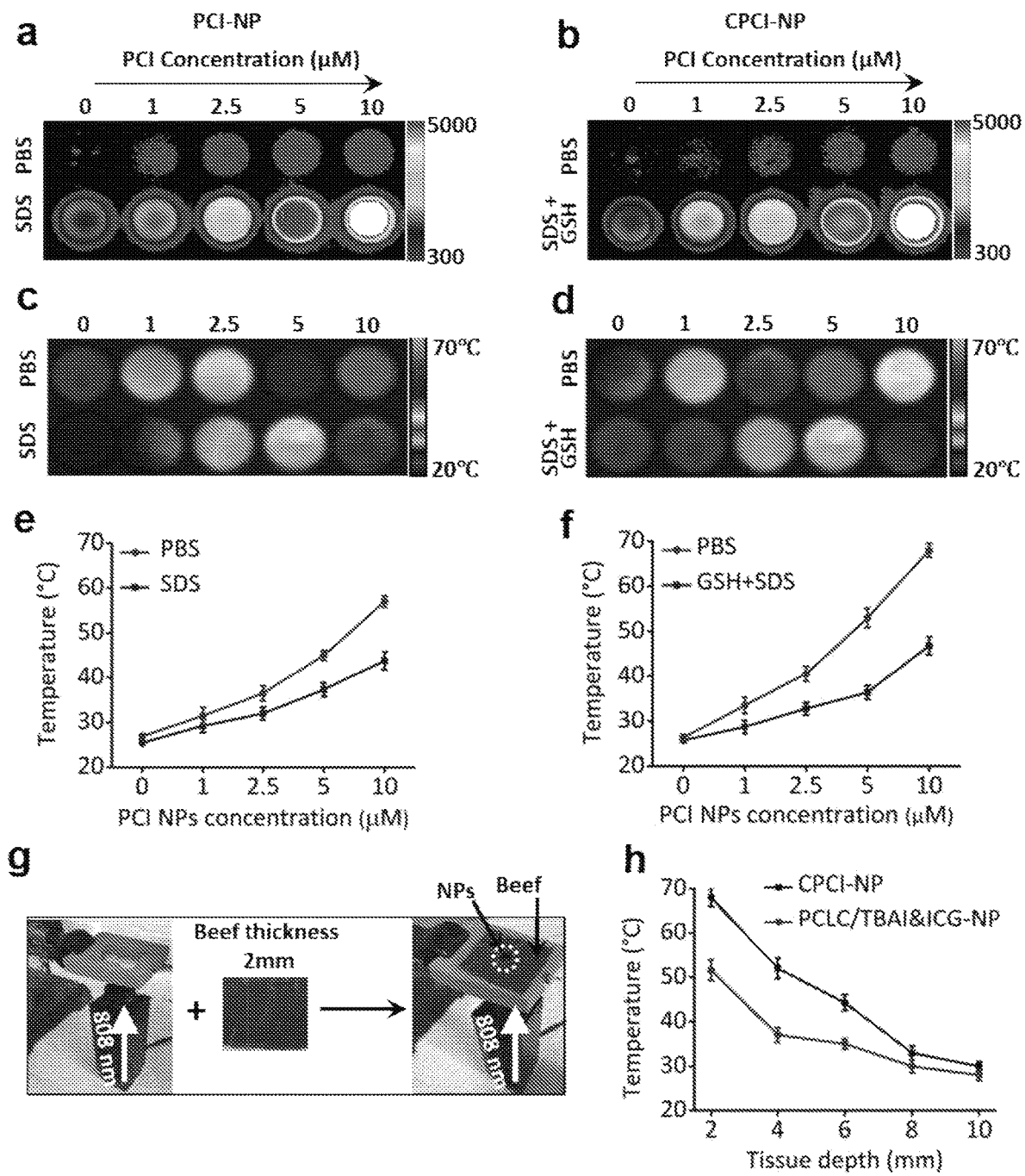
FIG. 3 shows mechanism analysis of CPCI NPs with high photothermal conversion efficiency. Near-infrared fluorescence imaging of (a) PCI NPs and (b) CPCI NPs solution (10 μL) in the absence and in the presence of SDS or GSH+SDS at the different concentration with an excitation band pass filter at 735/20 nm. Thermal images and quantitative temperature change curve of PCI NPs (c) & (e) and CPCI NPs (d) & (f). The results were expressed as the mean±s.d (n=3). The temperature was monitored by a thermal camera after irradiation with NIR laser (808 nm) at 0.8 W cm$^{-2}$ for 20 s. (g) Analogous instrument and (h) temperature variation of CPCI NPs and PCLC/TBAI&ICG NPs under laser irradiation at 808 nm (0.8 W cm$^{-2}$ for 30 s) to investigate penetration depth and thermal effect.

In order to further study the high photothermal conversion efficiency of CPCI-NP, the variation of fluorescence intensity at different concentration of PCI-NP and CPCI-NP in the form of assembly and disintegration was investigated. As shown in FIGS. 3a and 3b, owing to fluorescence self-quenching of ICGD inside the core of NPs, the fluorescence intensity of micellar PCI-NP and CPCI-NP were very weak in PBS. By contrast, when dissociated with SDS, fluorescence intensity of PCI-NP and CPCI-NP solution was found to be significantly enhanced. Photothermal conversion measurement of PCI-NP and CPCI-NP, on the other hand, demonstrated exact opposite properties, i.e. high photothermal conversion efficiency in micellar form and low photothermal conversion efficiency in dissociated form Compact configuration of ICGD in micellar PCI-NP or CPCI-NP resulted in efficient generation of heat under laser irradiation at 808 nm (FIGS. 3c and 3d). What is noteworthy is that the fluorescence intensity of CPCI-NP was weaker than that of PCI-NP (e.g. 320 vs. 800 at PCI concentration of 10 µM), while the photothermal conversion efficiency (temperature) was higher than that of PCI-NP at the same concentration in PBS (e.g. 69.6° C. vs. 58.2° C. at PCI concentration of 10 µM, FIGS. 3e and 3θ), indicating that configuration of ICGD in CPCI-NP was able to more efficiently convert excitation state energy into thermal energy rather than fluorescence. These results revealed that stable and compact micellar structure play a crucial role in thermal conversion of photothermal conversion agents.

Given that CPCI-NP would be used in vivo, the relationship between tissue depth and temperature of CPCI-NP under laser irradiation at 808 nm was determined in vitro using 2 mm thick beef slices as the surrogate tissue barrier for light. Traditional ICG after complexing with TBAI was physically encapsulated into PCLC telodendrimer as a control. As shown in FIGS. 3g and 3h, 808 nm laser irradiation of CPCI-NP and PCLC/TBAI&ICG-NPs at 0.8 W cm$^{-2}$ for 30 s through 2 mm beef slice can reach 70° C. and 50° C., respectively. The temperature of PCLC/TBAI&ICG NPs was found to decrease to less than 40° C. when beef thickness was increased to 4 mm. In contrast, the temperature of CPCI-NP was able to reach around 45° C. even with the beef thickness increased to 6 mm. Since thickness of normal human skin and facial skin is generally less than 4 mm and 2 mm respectively, photothermal treatment with CPCI-NP could potentially be used to treat primary skin cancers including melanoma. The superior performance of this photothermal nanosystem can be attributed to its high NIR absorbance, outstanding photothermal conversion efficiency, faster heating capability, and excellent photostability.

Figure 4:
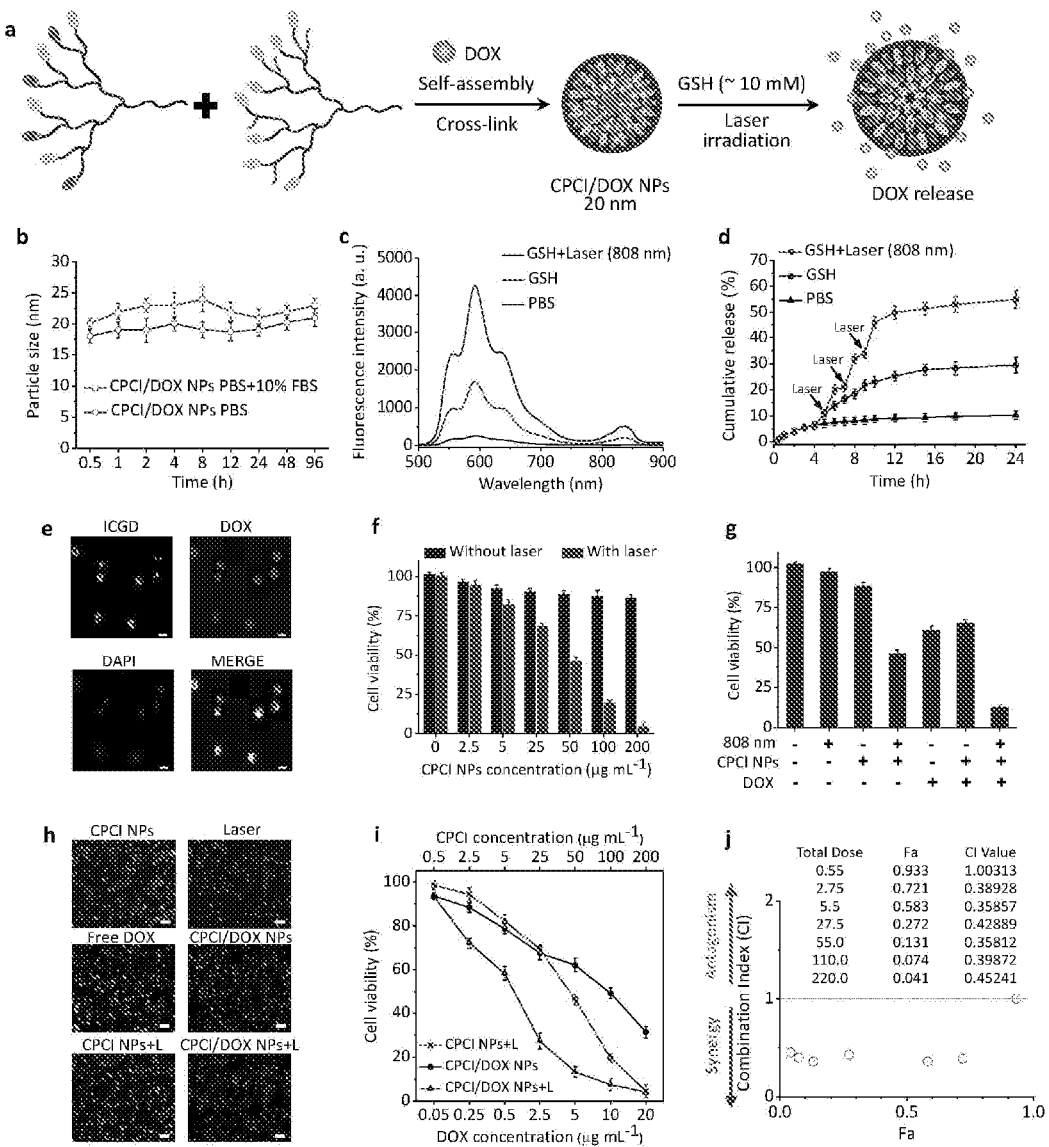
FIG. 4 shows Characterizations of CPCI/DOX NPs in vitro and synergistic cytotoxicity of CPCI/DOX NPs plus 808 nm laser against OSC-3 oral cancer cells. (a) Schematic illustration of self-assemble of CPCI/DOX NPs and DOX release from CPCI/DOX NPs. (b) Serum stability of CPCI/DOX NPs in PBS solution of pH 7.4 with/without 10% FBS was measured by dynamic light scattering (incubation temperature: 37° C.; data were mean±s.d., n=3). (c) Variation of DOX fluorescence intensity and (d) in vitro quantitative DOX release of CPCI/DOX NPs aqueous solution at PBS, GSH (10 mM) and 808 nm laser (0.8 W cm$^{-2}$, 2 min, 3 times)+GSH (10 mM), (DOX concentration: 0.05 mg mL$^{-1}$; data were mean±standard error of three parallel samples). (e) Uptake of DOX (red) loaded CPCI NPs (green) in OSC-3 oral cancer cell line. Cells were pretreated with Hoechst 33342 (blue) for 30 min for nucleus staining followed by incubation with CPCI/DOX NPs in PBS. Imaging was acquired after 6 h using Deltavision deconvolution microscope (Scale bar=5 μm). (f) Viability of OSC-3 oral cells incubated with CPCI NPs with or without NIR laser irradiation (0.8 W cm$^2$, 2 min) (n=3). (g) The cell viabilities and (h) live/dead staining by DiO/PI of OSC-3 oral cells after different treatments: CPCI NPs, 808 nm laser irradiation, free DOX, CPCI/DOX NPs, CPCI NPs with 808 nm laser irradiation and CPCI/DOX NPs with 808 nm laser irradiation at the CPCI NPs concentration of 50 μg mL$^{-1}$, scale bar=25 μm). (i) The synergistic treatment effect and (j) combination index between DOX and CPCI NPs plus laser for OSC-3 oral cells treatment.
Figure 14:
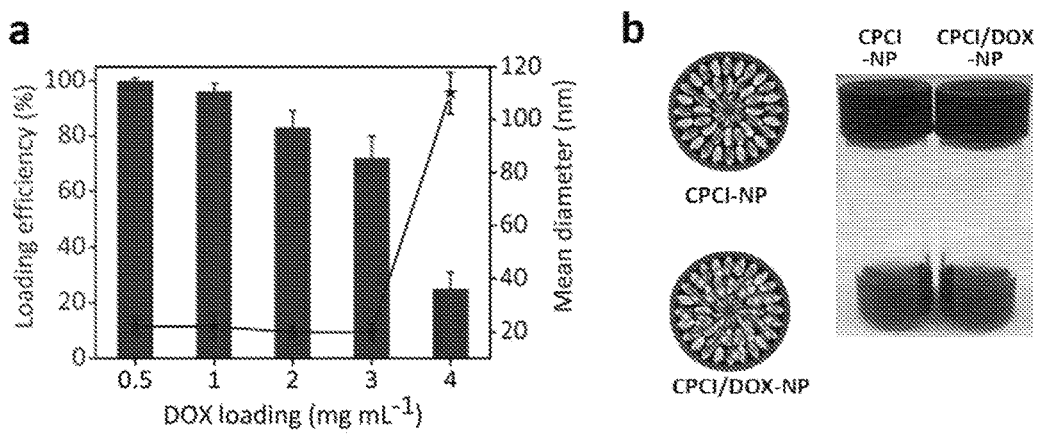
FIG. 14 shows (a) The encapsulation efficiency of DOX into CPCI NPs and size change of CPCI/DOX NPs versus the level of drug-loading. The encapsulation efficiency is defined as the ratio of drug loaded into nanoparticles to the initial drug content. The volume of the final solution was kept at 1 mL and the final concentration of the telodendrimer was 20 mg/mL. (b) Schematic illustration and representative photo of CPCI NPs and CPCI/DOX NPs in PBS solution (total telodendrimer concentration: 20 mg mL$^{-1}$; DOX concentration: 1 mg mL$^{-1}$).

DOX loading capacity of CPCI-NP. It was previously demonstrated that encapsulated doxorubicin can synergize the phototherapeutic effects of porphyrin-based nanocarrier. Based on experience in telodendrimer-based micellar nanocarrier, CPCI-NP is expected to be an excellent carrier for doxorubicin (DOX) (FIG. 4a). As shown in FIG. 14a, the drug encapsulation efficiency of DOX by CPCI-NP was 100% at a DOX concentration of 0.5 mg mL$^{-1}$. When DOX concentration was raised to 3 mg mL$^{-1}$, the encapsulation efficiency was still above 70%, with a particle size remained at ~20 nm, confirming excellent drug loading capacity of CPCI-NP. CPCI/DOX-NP showed good serum stability in aqueous solution at 37° C. When 10% fetal bovine serum (FBS) was present in the solution, the particle size of CPCI/DOX-NP did not change at neutral environment over the experimental period of 96 h (FIG. 4b). Correspondingly, DOX could be controllably released from CPCI/DOX-NP under stimuli. Because fluorescence quenching of encapsulated DOX molecules, CPCI/DOX-NP PBS solution showed very weak fluorescence signal of DOX. However, fluorescence intensity of DOX was higher in GSH (~10 mM), due to the cleavage of disulfide bonds, resulting in an increase in DOX release. The fluorescent intensity of DOX could be further enhanced when CPCI/DOX-NP was perturbed with laser irradiation at 808 nm (0.8 W cm$^2$, 5 min) in the presence of GSH (~10 mM) (FIG. 4c). Similar results were shown in quantitative DOX release experiments. As shown in FIG. 4d, DOX release from CPCI/DOX-NP exhibited typical GSH- and photo-responsive release profiles. Without GSH and 808 nm laser irradiation, DOX release rate in PBS was very slow (5.1% after 4 h, and less than 11% after 24 h). When GSH (~10 mM) was added into solution, DOX release amount was increased to 30% after 24 h. It was worth noting that DOX release could be dramatically increased at all times upon laser irradiation, and the total releasing amount of DOX could be further increased to 55% after 24 h, when CPCI/DOX-NP was exposed to GSH (~10 mM) and sequential irradiation with 808 nm laser (2 min each times 3). The enhanced release of DOX is probably due to the cleavage of S—S bonds at reducing environment with GSH plus local hyperthermia induced by photothermal conversion with laser, both of which could accelerate the diffusion of DOX out from cross-linked NPs. On-demand GSH (or N-acetyl cysteine)- and photo-responsive drug release can be exploited to reduce the side effects of chemotherapeutics to normal tissues and enhance the cytotoxic effects at the tumor sites, after significant portion of CPCI/DOX-NP has reached the tumor sites.

Cellular uptake and in vitro antitumor activity of CPCI/DOX-NP. Cellular uptake and intracellular distribution of CPCI/DOX-NP were evaluated by confocal laser scanning microscopy (CLSM) in OSC-3 oral cancer cells. Confocal fluorescent micrographs clearly showed intracellular distribution of DOX and CPCI-NP (FIG. 4e). After 6 h incubation, majority of the green fluorescence signal from ICGD remained in the cytoplasm. By contrast, DOX fluorescence was predominantly observed in the nucleus at this time point, which turned the nuclei pink due the overlap of the red DOX and blue 4',6-diamidino-2-phenylindole (DAPI) fluorescence. This result revealed that the CPCI/DOX-NP could be rapidly taken up by cancer cells, and then the encapsulated DOX could be released into nucleus for DNA intercalation within a short period of time.

Figure 5:
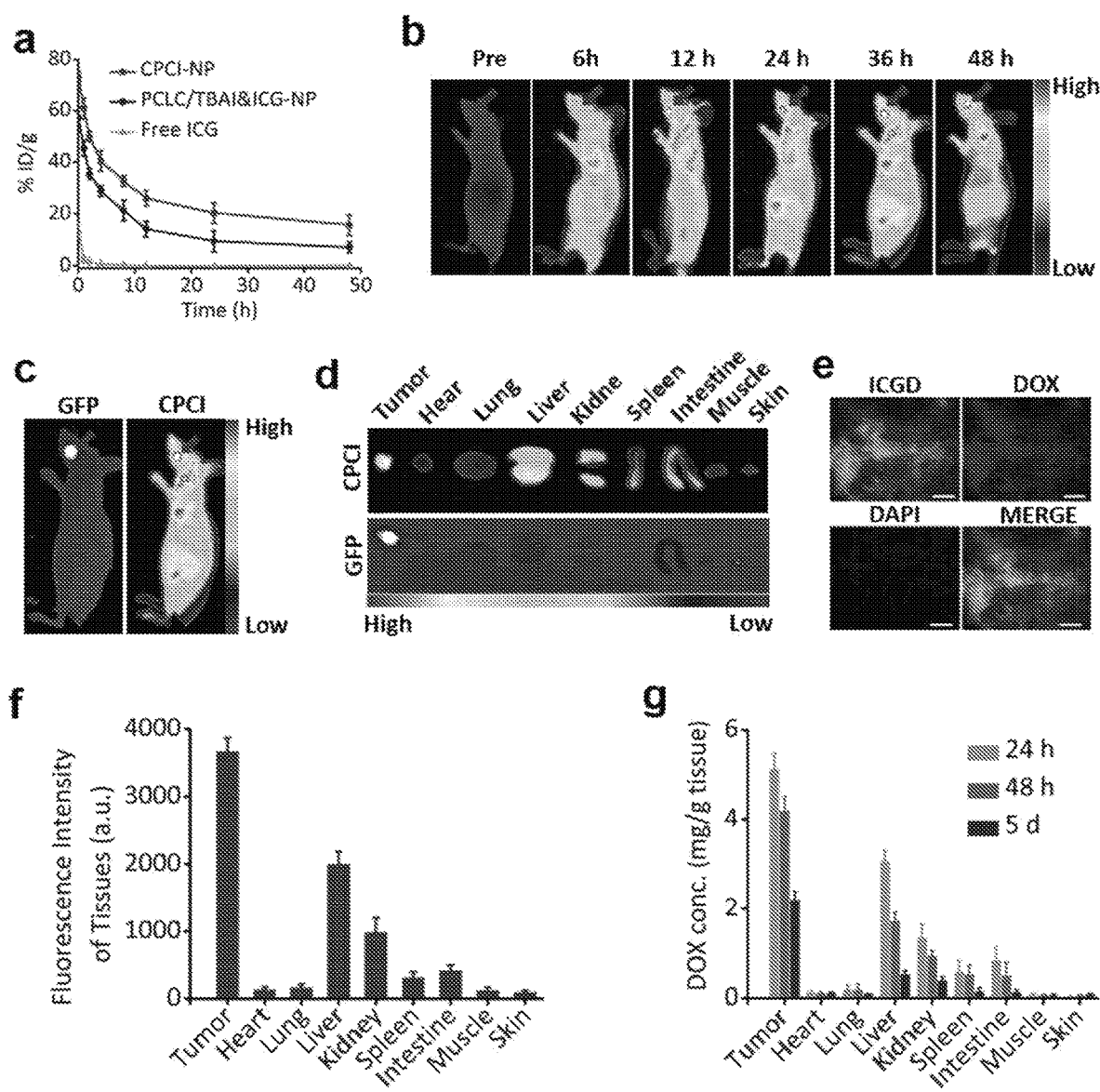
FIG. 5 shows CPCI/DOX NPs tumour imaging in vivo. (a) In vivo blood elimination kinetics of CPCI NPs, PCLC/TBAI&ICG NPs and free ICG at a dose of 5 mg kg$^{-1}$ body weight (n=3 for each group). The results were expressed as the mean±s.d. (b) ICGD fluorescence imaging showing tumour accumulation at different time points after tail vein injection and (c) representative in vivo imaging of nude mice bearing in situ OSC-3 oral cancer labeled by GFP following intravenous injection of CPCI/DOX NPs (DOX dose: 2.5 mg kg$^{-1}$; total telodendrimer dose: 50 mg kg$^{-1}$; ICGD dose: 7 mg kg$^{-1}$). The red arrow points to the tumour site. (d) Representative ex vivo ICGD fluorescence imaging of the organs and tumours excised at 48 h post-injection time from the same animal. (e) Imaging of the distribution of CPCI/DOX NPs in OSC-3 tumour tissue at 48 h post injection observed by laser scanning confocal microscope. Red: DOX; Green: ICGD. (f) Fluorescence signal intensity of ICGD inside organs and tumour at 48 h post injection of CPCI/DOX NPs. (g) DOX distribution in organs and tumours tissues of in situ OSC-3 oral cancer mice 24 h, 48 h and 5 d post injection of CPCI/DOX NPs, measured by inductively coupled plasma mass spectrometry (ICP-MS, Agilent Technologies, 7500ce). Three mice were used in each time point experiment. Mice received CPCI/DOX NPs at the dose of DOX 2.5 mg kg$^{-1}$. The results were expressed as the mean±s.d.
Figure 17:
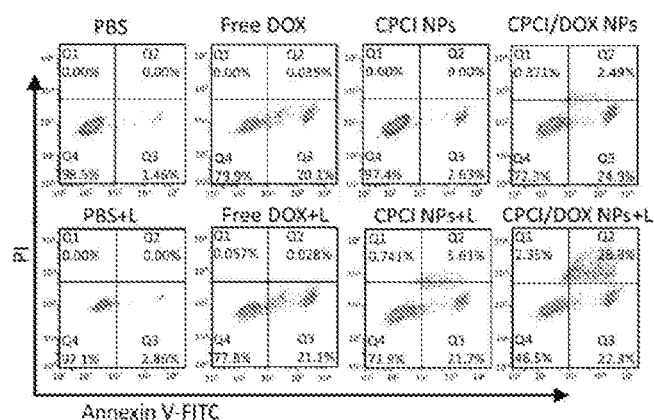
FIG. 17 shows detection of apoptotic OSC-3 oral cells using Annexin V-FITC and PI flow cytometry assay at various cell culture conditions. Q1: necrotic cells; Q2: late stage apoptotic cells; Q3: normal viable cells; Q4: early stage apoptotic cells. DOX dose: 0.005 mg mL$^{-1}$; 808 nm laser irradiation: 0.8 W cm$^{-2}$, 2 min.

The synergistic chemo-/photothermal effects of CPCI/DOX-NP were evaluated on OSC-3 cells by a MTS assay. As shown in FIG. 4f, CPCI-NP without laser exhibited negligible toxicity to cells even at a high concentration (200 μg mL$^{-1}$) after incubation for 12 h. However, when an 808 nm NIR irradiation (0.8 W cm$^2$, 2 min) was applied, the viability of OSC-3 cells decreased significantly as the CPCI-NP concentration increased. The cell viability was less than 5% at a concentration of 200 μg mL$^{-1}$, indicating the photothermal effect of CPCI-NP could effectively kill the cancer cells. The chemo-/photothermal synergistic therapy effect was further studied by using 50 μg mL$^{-1}$ concentrations of CPCI-NP. For CPCI/DOX-NP alone at this lower concentration, only 45% cells were killed without laser irradiation. By sharp contrast, more than 85% cells were killed when cells were treated with CPCI/DOX-NP in combination with 808 nm laser irradiation, which was more effective than free DOX (with cell viability at 61%) or CPCI-NP under 808 nm laser irradiation (with cell viability at 46%) (FIG. 5g). The live/dead cells were co-stained with DiO (green fluorescence) and propidium iodide (PI, red fluorescence). As shown in FIG. 4h, most of cells were apoptotic/dead and stained by propidium iodide (PI) with red fluorescence after treatment with CPCI/DOX-NP under laser irradiation at 808 nm, while significant amounts of living cells with green fluorescence could still be observed in other control groups. The combination therapeutic effect by calculating the combination index was determined. The results displayed excellent synergistic effect to kill tumor cells in vitro between DOX and CPCI-NP+light with increasing DOX and CPCI-NP concentrations (FIGS. 4i and 4j). Annexin FITC/PI assay was conducted to reveal whether the above mentioned synergetic actions on OSC-3 cells may result in enhancement of cell apoptosis. As shown in FIG. 17, neither 808 nm laser irradiation nor CPCI-NP had significant pro-apoptotic effects. In comparison, both CPCI/DOX-NPs without laser irradiation and CPCI-NP with laser irradiation was found to be able to enhance apoptosis, leading to 27.39% and 27.31% apoptotic cells, respectively. The percentage of apoptotic cells further increased to 51.1% when CPCI/DOX-NPs was used in combination with laser irradiation, which was in consistent with the MTS results.

Figure 15:
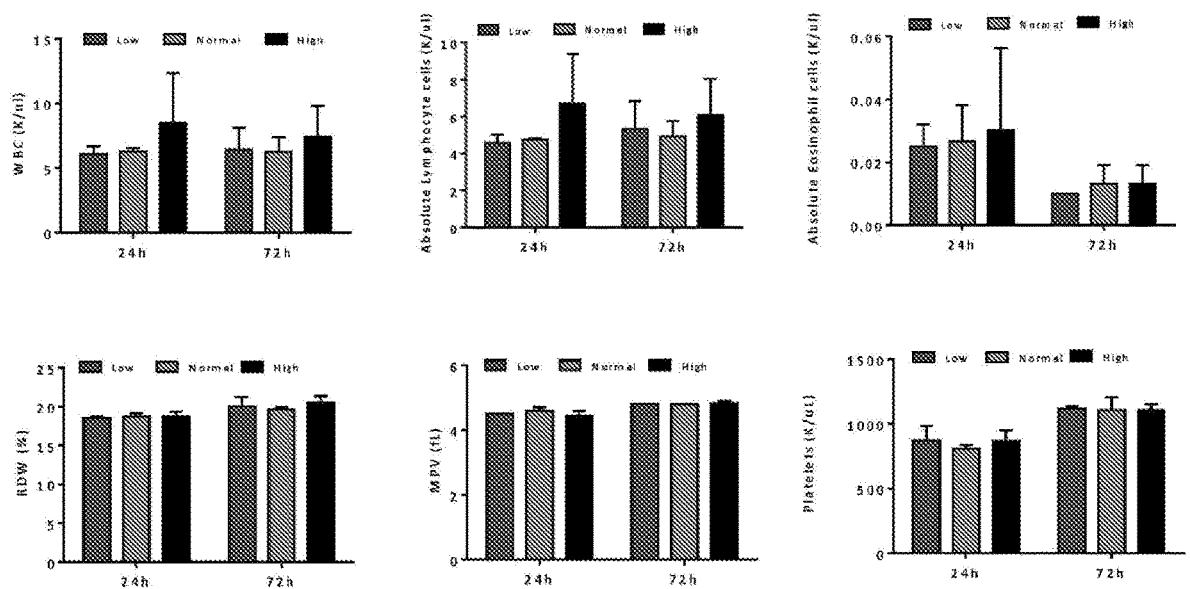
FIG. 15 shows blood test parameters in terms of white blood cells (WBC), lymphocyte, eosinophil, red cell distribution width (RDW), platelets and mean platelet volume (MPV) of healthy Balb/c mice intravenously injected with three different concentration CPCI NPs for 24 h and 72 h.
Figure 16:
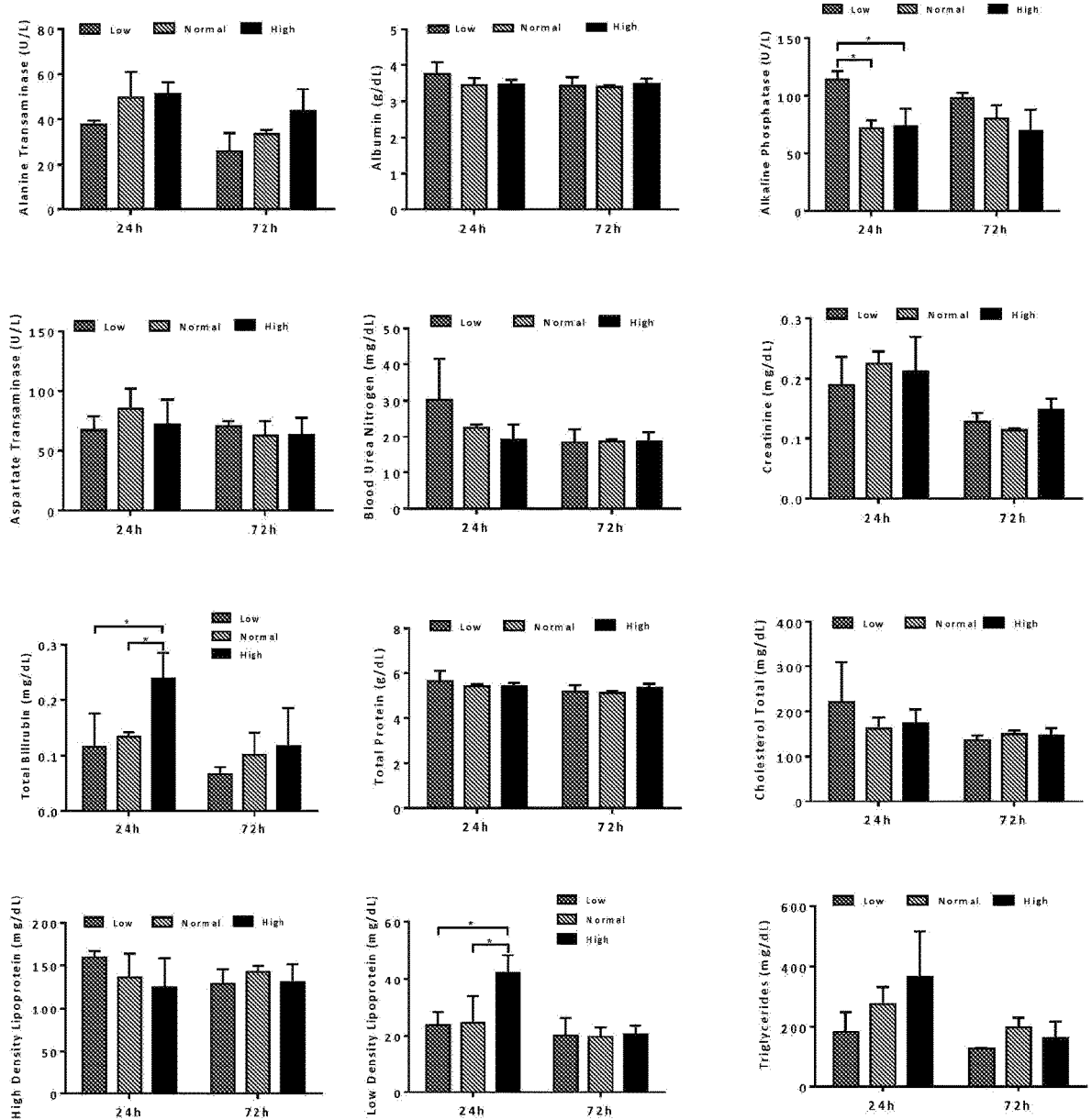
FIG. 16 shows blood test parameters in terms of liver function alanine aminotransferase, albumin, alkaline phosphatase, aspartic acid transaminase, blood urea nitrogen, creatinine, bilirubin, total protein, cholesterol, high density lipoprotein, low density lipoprotein and triglycerides of healthy Balb/c mice intravenously injected with three different concentration CPCI NPs for 24 h and 72 h.

Biodistribution and drug-delivery of CPCI/DOX-NP. After demonstrating the synergistic function of CPCI/DOX-NP plus 808 nm laser irradiation in in vitro experiments, its efficacy in the animal tumor model was evaluated. To investigate the potential toxicology of CPCI-NP, three dose levels of CPCI-NP were given intravenously to healthy Balb/c mice (50, 100, and 200 mg kg$^{-1}$ based on telodendrimer) and blood were collected on day 1 and day 3 for serum chemistry and blood counts. White blood cells (WBC), lymphocyte, eosinophil, red cell distribution width (RDW), platelets, as well as mean platelet volume (MPV) on day 1 and day 3 were normal (FIG. 15). Similarly, liver function tests (alanine aminotransferase, alkaline phosphatase, aspartic acid transaminase, bilirubin), renal panel (blood urea nitrogen, creatinine), and other blood chemistries (albumin, total protein, cholesterol, high density lipoprotein, low density lipoprotein and triglycerides) were all found to be normal (FIG. 16), revealing no obvious hepatic and renal toxicities. It can be concluded that CPCI-NP is a highly biocompatible photothermal conversion nanoagent with no significant side effects on mice. Since CPCI-NP is cross-linked by disulfide bonds, it is expected to be relatively stable during circulation. Pharmacokinetics studies comparing free ICG, ICG and TBAI co-encapsulated by PCLC cysteine containing telodendrimer (PCLC/TBAI&ICG NPs), and CPCI-NP were performed in female Sprague-Dawley rats. As shown in FIG. 5a, hydrophilic free ICG quickly diffused into tissue and was cleared from circulation within 30 min after intravenous administration ($t_{1/2}$=5.22 min; AUC=12.091 mg/L*h). After intravenous injection for 48 h, the concentration of ICG from PCLC/TBAI&ICG NPs in blood was found to decrease to 9.4% injected dose per gram of tissue (% ID g$^{-1}$) ($t_{1/2}$=28.421; AUC=677.571 mg/L*h). In contrast, about 20.4% ID g$^{-1}$ of ICGD from CPCI-NP was still in blood circulation ($t_{1/2}$=41.098; AUC=1196.274 mg/L*h), indicating high stability of ICGD and CPCI-NP.

The particle size of CPCI/DOX-NP is about 20 nm (FIG. 2d), which is an optimal size for tumor targeting and penetration. Due to its relatively small size, reversibly crosslinking nature and unique architecture-dependent near-infra red fluorescence property, CPCI/DOX-NP is particularly suitable for use as activatable optical nanoprobes for improved cancer detection through background suppression in blood, as well as preferential accumulation and signal amplification at the tumor site. FIG. 4c shows the near infra-red fluorescent imaging of athymic mice bearing in situ OSC-3 oral cancer after intravenous (i.v.) injection of CPCI/DOX-NP (DOX: 1.25 mg kg$^{-1}$, PCI telodendrimer: 12.5 mg kg$^{-1}$ and PCLC telodendrimer: 12.5 mg kg$^{-1}$). Fluorescent signal of ICGD at the tumor site (indicated by green fluorescent protein (GFP)) was found to be time-dependent and peaked at 36 h after CPCI/DOX-NP injection (FIG. 5c). The intense fluorescence at the tumor sites showed no obvious decay even at 48 h after injection, implying a persistent tumor accumulation of CPCI/DOX-NP, which meant a wide time window for initiating phototherapy in vivo. Semi-quantitative biodistribution based on ex vivo imaging of major organs and tumor collected at 48 h post injection indicated the high tumor uptake of CPCI/DOX-NP (FIGS. 5d and 5f). Meanwhile, tumor tissue slice was observed under fluorescence microscope to further verify tumor accumulation of CPCI/DOX-NP. As shown in FIG. 5e, highly coincident fluorescent signals of ICGD (green color) and DOX (red color) concurrently appeared in the tumor regions.

The tissue distribution of DOX over time in nude mice bearing orthotopic OSC-3 oral cancer after tail vein administration of CPCI/DOX-NP was determined. At 24 h, 48 h and 5 d after injection, DOX concentrations in tumor and normal organs were measured by high pressure liquid chromatography-mass spectroscopy (HPLC-MS). As shown in FIG. 5g, significant accumulation of DOX in the tumor, liver and even kidney were noted 24 h after CPCI/DOX-NP administration. However, accumulation concentration of DOX in liver and kidney were rapidly cleared with the passage of time, especially after 5 days. More excitingly, DOX concentration at the tumor site was still up to about 2 μg per g tissue 5 days after injection of CPCI/DOX-NP, which could explain its anti-tumor efficacy shown below. DOX is commonly used to treat many different cancers; cardiotoxicity and myelosuppression are the dose limiting toxic side effects for this very important drug. Fortunately, according to FIGS. 5e and 5g, fluorescence intensity of ICGD and concentration of DOX in the heart were extremely low, indicating low accumulation of CPCI/DOX-NP and low DOX release in the heart. This very important attribute is needed for future successful clinical applications of CPCI/DOX-NP.

Figure 6:
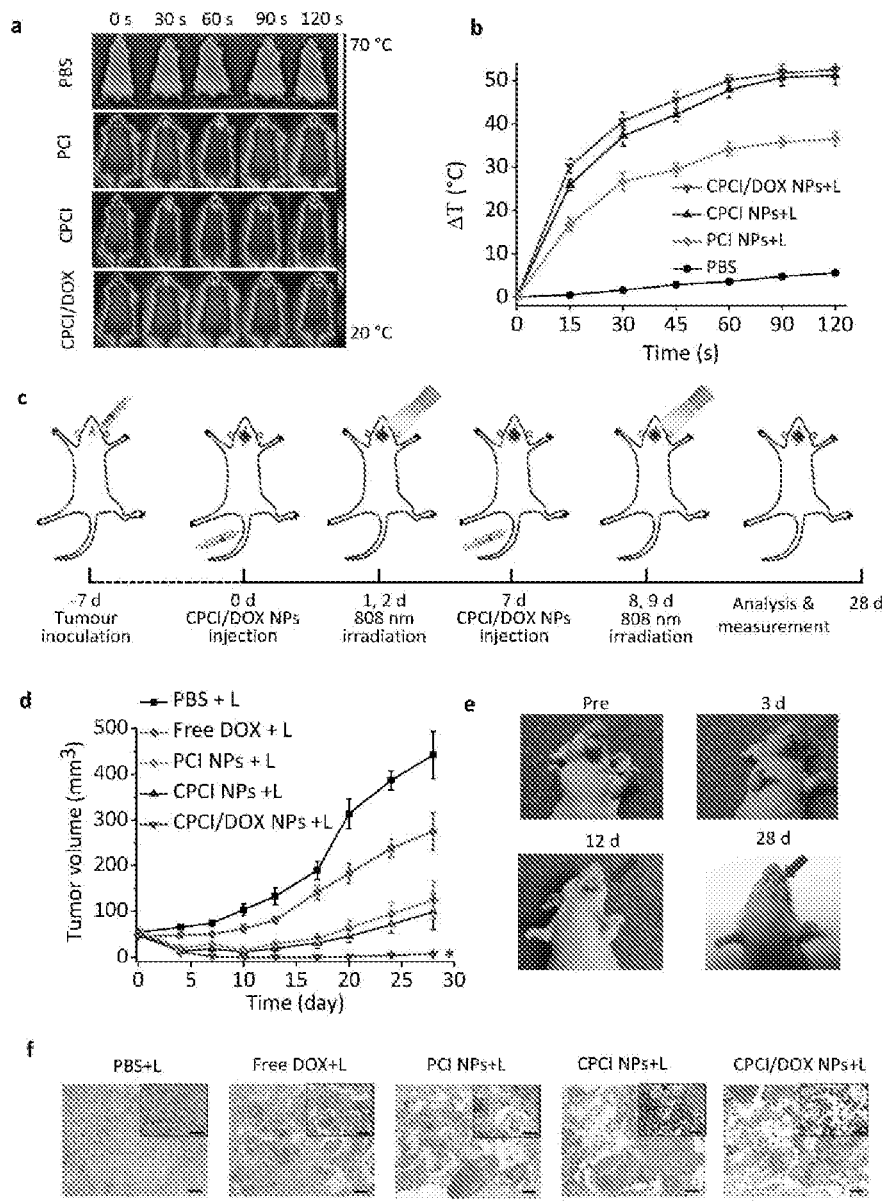
FIG. 6 shows synergistic antitumour activity of PTT/chemotherapy in the mice bearing in situ OSC-3 oral cancer. (a) IR thermal images and (b) mean tumour temperature of OSC-3-bearing mice under 808 nm laser irradiation (0.8 W cm$^2$) at 24 h after systemic administration of PBS, PCI NPs, CPCI NPs, or CPCI/DOX NPs (n=3). (c) Schematic illustration of CPCI/DOX NPs based PTT and chemotherapy to inhibit in situ oral tumour growth. (d) Tumour growth curves of mice (five mice per group) bearing in situ OSC-3 oral tumours. (e) Representative photo of tumour volume variation in the group treated by CPCI/DOX NPs plus 808 nm laser. (f) Histological H&E staining of tumour slices at day 28 after different treatments indicated (Scale bar=100 μm in ×100 figures and scale bar=25 μm in ×400 figures). Dose of DOX: 2.5 mg kg$^{-1}$ and ICGD: 7 mg kg$^{-1}$. *P values in d was calculated by Tukey's post-hoc test (*P<0.05) by comparing other groups with the last group (CPCI/DOX NPs+808 nm laser). Data are presented as the mean±s.d.

In vivo photothermal-/chemotherapy synergistic effect based on CPCI/DOX-NP. Encouraged by the outstanding biodistribution and in vitro antitumor activity of CPCI/DOX-NP system, therapeutic efficacy studies in athymic mice bearing orthotopic oral cancer was carried out next. First, in vivo photothermal effect of CPCI/DOX-NP was investigated. Twenty-four hours after systemic administration of PBS, PCI-NP, CPCI-NP or CPCI/DOX-NP, the tumor region in living mice was irradiated by 808 nm laser with the power intensity of 0.8 W cm$^{-2}$ for 2 min. As shown in FIGS. 6a and 6b, upon laser irradiation, the mean temperature of tumor region for both CPCI-NP and CPCI/DOX-NP groups increased by about 50° C., which was about 1.37-fold higher than that of the PCI-NP ($\Delta T \approx 36.5°$ C.) group, and 8.92-fold higher than that of the PBS ($\Delta T \approx 5.6°$ C.) group. Such high increase in temperature was more than sufficient to cause irreversible damage to cancer cells. It is noteworthy that it only took 45 seconds for tumor site of CPCI-NP or CPCI/DOX-NP groups to rapidly heat up more than 40° C., which was in accordance with fast heating rate in vitro test. These results clearly demonstrated that CPCI/DOX-NP could efficiently absorb the NIR light energy and convert it into local heat in vivo for photothermal treatment.

Figure 18:
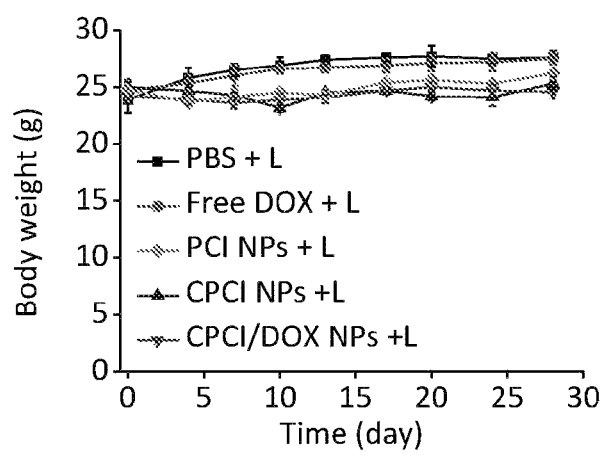
FIG. 18 shows body weight curves of the experimental mice bearing in situ OSC-3 oral cancer receiving different therapeutic formulations via tail vein at an interval of 3 days (n=5; DOX dose: 2.5 mg kg$^{-1}$ and ICGD dose: 7 mg kg$^{-1}$; data were mean±standard error of three parallel samples).

The therapeutic efficacy of these photothermal agents was explored in nude mice bearing orthotopic OSC-3 cells oral cancer. The mice were randomly divided into five groups: (1) PBS, (2) free DOX, (3) PCI-NP, (4) CPCI-NP and (5) CPCI/DOX-NP. Near infra-red laser irradiation (808 nm, 0.8 W cm$^{-2}$ for 2 min) was used in all groups. The design of animal experiment was shown in FIG. 6c. When tumor volume reached about 50 mm$^3$, CPCI/DOX-NP was injected via tail intravenous, and then tumor area was exposed to 808 nm laser irradiation for 2 min (0.8 W cm$^{-2}$) at 24 h and 48 h after injection (i.e. day 2 and 3). Afterwards, the same treatment regimen (photothermal agent followed by light irradiation) was repeated on day 7, 8 and 9. As shown in FIG. 6d, PCI-NP group, CPCI-NP group and CPCI/DOX-NP group displayed satisfactory antitumor effect in the first 10 days of treatment. However, for both the PCI-NP and CPCI-NP groups, tumor began to regrow at the primary site after day 10. In contrast, complete tumor remission was achieved in the animals receiving CPCI/DOX-NP plus laser irradiation, validating synergistic therapeutic efficacy of photothermal-/chemotherapy. FIG. 5e shows the photographs of mice treated with CPCI/DOX-NP plus laser irradiation. No tumor was found at day 28. In addition, there was no significant change in body weights after the treatments (FIG. 18). The histological analysis further confirmed that most of tumor cells were destroyed under the treatment of CPCI/DOX-NP plus 808 nm laser irradiation with much lower level of nuclear polymorphism and less cancer cell density in tumor sections than that other groups (FIG. 60.

Figure 7:
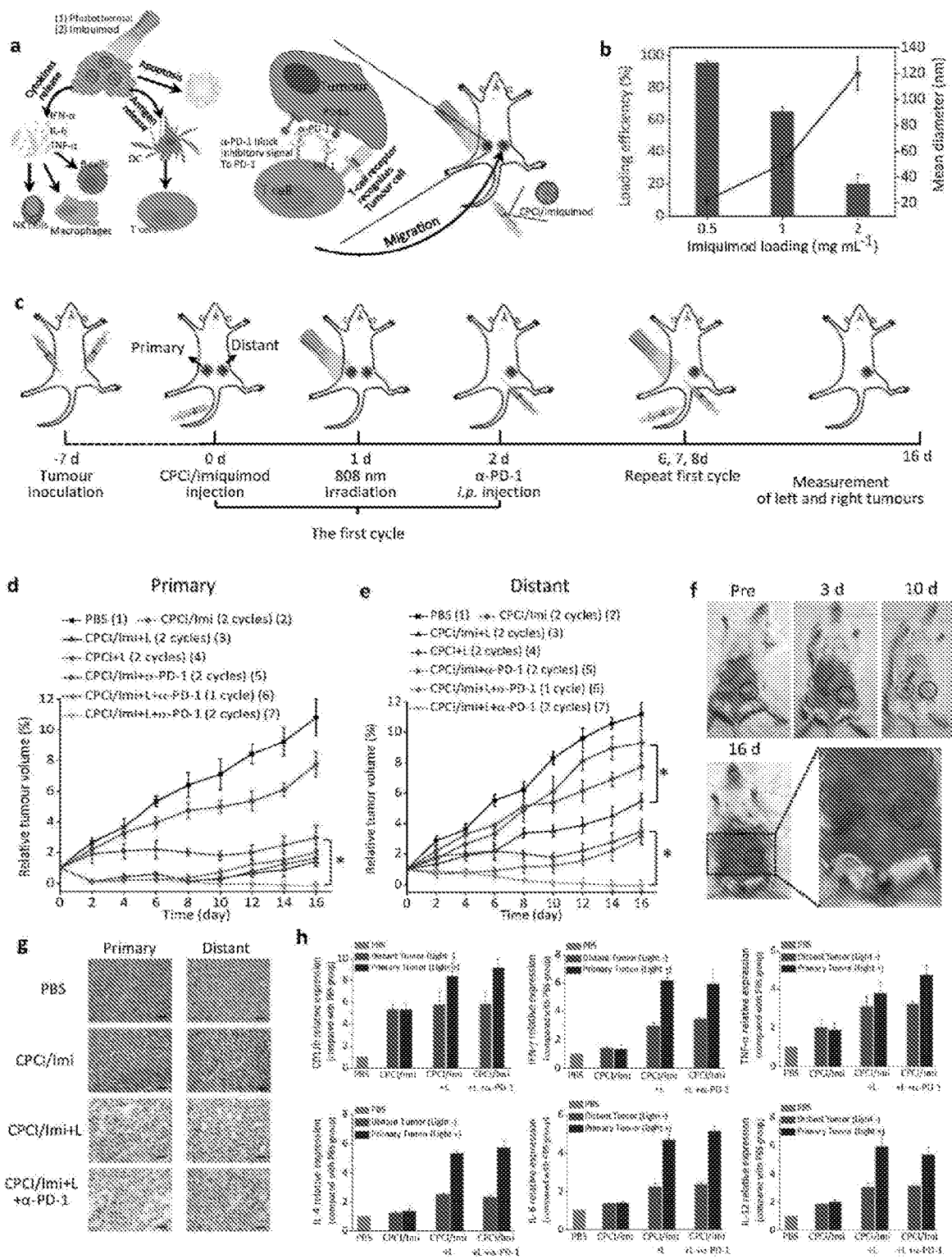
FIG. 7 shows synergistic antitumour activity of photothermal-/immunotherapy in the mice bearing in situ 4T1 breast cancer (both sides). (a) Schematic illustration of the proposed mechanism of antitumour immune responses induced by CPCI/Imiquimod NPs in combination with α-PD-1 therapy. (b) The encapsulation efficiency of imiquimod into CPCI NPs and size change of CPCI/Imiquimod NPs versus the level of drug-loading. The encapsulation efficiency is defined as the ratio of drug loaded into nanoparticles to the initial drug content. The volume of the final solution was kept at 1 mL and the final concentration of the telodendrimer was 20 mg mL$^{-1}$. (c) Schematic illustration of synergistic therapy effect of photothermal-/immunotherapy to inhibit tumour growth at primary and distant sites. (d) Primary tumour and (e) distant tumour growth curves of different groups of mice (six mice per group) with s.c. inoculation of 4T1 tumours (dose of imquimod: 1.25 mg kg$^{-1}$, total telodendrimer: 50 mg kg$^{-1}$ and ICGD: 7 mg kg$^{-1}$, intraperitoneal injection of anti-PD-1 200 μg per mouse on day 2 and 8). *P<0.05 in d by comparing group 5 (CPCI/Imiquimod NPs+α-PD-1) with group 7 (CPCI/Imiquimod NPs+808 nm laser+α-PD-1); *P<0.05 in e by comparing group 5 (CPCI/Imiquimod NPs+α-PD-1) with group 7 (CPCI/Imiquimod NPs+808 nm laser+α-PD-1) and comparing group 4 (CPCI/Imiquimod NPs) with the group 3 (CPCI/Imiquimod NPs+808 nm laser). (f) Representative photo of tumour volume variation in the mouse treated by CPCI/Imiquimod NPs plus 808 nm laser plus α-PD-1. The red circle and blue circle shows primary and distant tumour, respectively. (g) H&E-stained tumour slices collected from mice post various treatments indicated (Scale bar=25 μm). (h) The expression of CD11b, IFN-γ, TNF-α, IL-4, IL-6 and IL-12 with different treatments in both sides tumour tissues evaluated by RT-qPCR (mean±s.d.; n=3). (i) IHC staining for CD8$^+$, PD-1, CD3$^+$, and CD4$^+$ T cells in both sides tumour tissue, collected in different treatments. Scale bar is 25 μm

In vivo photothermal-/immunotherapy synergistic effect based on CPCI/imiquimod-NP. The aforementioned experimental results clearly demonstrate that CPCI/DOX-NP is a highly efficacious phototherapeutic system for local therapy where the treatment region is accessible to light. However, cancers are often accompanied by recurrence and metastasis and the majority of cancer deaths are caused by metastases. In the last few years, immunotherapy with check-point blockade antibodies has been proven to be clinically very promising, although the response rate varies greatly among different tumors types. Imiquimod is an immune response modifier that binds to toll-like receptor 7, and it has been approved by the U.S. Food and Drug Administration (FDA) for topical treatment of genital warts, superficial basal cell carcinoma and actinic keratosis. It is too toxic to be given systemically. Owing to the excellent encapsulating ability of CPCI-NP, imiquimod can be loaded into the core of CPCI-NP with extremely high drug encapsulating capacity (imiquimod concentration: 0.5 mg mL$^{-1}$), while keeping a desirable nanoparticle size of 22±4 nm for tumor accumulation via EPR effects (FIG. 7b). Photothermal/immunotherapy based on new CPCI/imiquimod-NPs, in combination with PD-1 check point blockade therapy, could enhance the anticancer synergistic therapeutic efficacy against metastatic tumors was investigated (FIG. 6a).

The design of animal experiment is shown in FIG. 7c. An artificial mimic of metastasis tumor (bilateral breast tumor model) was developed by orthotopically injecting 4T1 cells into both the left and right mammary fat pad of the same immunocompetent mouse. The left tumor was designated as the primary tumor to be treated by light and the right tumor was inoculated as a distant tumor or "metastastatic" tumor without light treatment. Mice were randomly divided into seven groups: (n=6 per group): (1) PBS (untreated); (2) CPCI/imiquimod-NP for 2 cycles treatment; (3) CPCI-NP combining laser irradiation for 2 cycles treatment; (4) CPCI/imiquimod-NP combining laser irradiation for 2 cycles treatment; (5) CPCI/imiquimod-NP plus anti-PD-1 for 2 cycles treatment; (6) CPCI/imiquimod-NP combining laser irradiation plus anti-PD-1 for 1 cycle treatment; (7) CPCI/imiquimod-NP combining laser irradiation plus anti-PD-1 for 2 cycles treatment. For group 7, when tumor volume reached about 50 mm$^3$, CPCI/imiquimod-NP solution was injected via tail intravenous. After injection 24 h, the primary tumor was locally exposed to 808 nm laser irradiation for 2 min (0.8 W cm$^{-2}$). Afterwards, mice were intraperitoneally (i.p.) injected with anti-PD-1 (α-PD-1) at doses of 200 μg per mouse on day 2. Subsequently, second cycle administrations (i.v. injection of CPCI/imiquimod-NP, tumor local laser irradiation and i.p. injection of α-PD-1) were repeated one time on day 6, 7 and 8. The growth of primary tumors and distant tumors in different groups was measured by a caliper every other day. As shown in FIG. 7d, the primary tumors of all groups locally irradiated by 808 nm laser were almost eliminated by CPCI-NP-based early stages photothermal therapy. Due to lack of further treatment such as second laser irradiation or the absent of imiquimod or α-PD-1 immunity effect, a slightly tumor recurrence occurred at control groups 3, 4 and 6 after laser irradiation. It's worth noting that group 5 (CPCI/imiquimod-NP plus α-PD-1) slowed inhibition of the growth of primary tumors to some extent, but couldn't eliminate the tumor without laser irradiation. In strike contrast, the combination treatment with 2 cycles of combination CPCI/imiquimod-NP and α-PD-1 (group 7) could significantly eliminate primary tumors without recurrence within the earliest 16 days, indicating that such non-specific combined immunotherapy could be effective in cancer treatment.

On the other hand, as shown in FIG. 7e, for mice with their primary tumors ablated by CPCI/imiquimod-NP based PTT, the growth of their distant tumors was also partly delayed. Especially in group 7, their distant tumors showed almost complete disappearance, achieving efficacies much better than that obtained in group 5 (CPCI/imiquimod-NP and α-PD-1 treatment, but without PTT of primary tumors), which verified that PTT for primary tumor also elicited an obvious inhibitory effect on distant tumor. Representative photographs of primary and distant tumors volume variation in the mouse treated by group 7 was showed (FIG. 7f). As another control, the immunological response induced by group 4 (CPCI/imiquimod-NP-based PTT of primary tumors together with α-PD-1 blockade therapy) was much better than that in group 3 (without imiquimod), demonstrating the important role of imiquimod for those NPs to trigger strong immune responses. Last but not least, the immunological response induced by CPCI/imiquimod-NP-based PTT of primary tumors group 4 (without α-PD-1) or group 6 (α-PD-1 treatment only 1 cycle) could only inhibit the growth of secondary tumors in the early days, revealing α-PD-1 blockade treatment strategy played a central role in continually killing tumor cells via activating T cells to recognize tumor cells. The mechanism of synergistic anti-tumor effect triggered by CPCI/imiquimod-NP-based PTT combining with α-PD-1 therapy was further investigated. In experiments, mice were divided into four groups for one cycle treatment (group 1: PBS; groups 2: CPCI/imiquimod-NP; group 3; CPCI/imiquimod-NP plus laser irradiation; group 4: CPCI/imiquimod-NP plus laser irradiation plus anti-PD-1; n=6 per group). And mice were sacrificed and both sides of the tumor residue tissues were collected for assessment by H&E staining, RT-PCR and IHC. H&E staining directly displayed large areas of primary tumor cellular destruction and apoptosis in group 3 and 4, and distant tumors also shrunk because of immunotherapy effect response, which was in obvious contrast to control group1 and 2 (FIG. 7g). Imiquimod is a potent TLR7 agonist and it can activate natural killer cells, macrophages and B-lymphocytes via TLR-7 secrete cytokines (IFN-α, IL-6 and TNF-α) to further enhance activation of the immune response. IFN-α, TNF-α, IL4, IL6 (cellular immune related markers), and IL-12 (innate immune marker) gene expression via RT-PCR was evaluated. As shown in FIG. 7h, the relative expression of these immune markers in primary tumor sides with laser irradiation was higher than that without laser irradiation, which verified that PTT could induce strong tumor-specific immune responses by producing tumor-associate antigens from ablated tumor cell residues. In addition, the relative expression of these immune markers in the distant tumors demonstrate the importance of light irradiation of primary tumors (group 3 and 4). Cytotoxic T lymphocytes (CD8$^+$) could directly kill targeted cancer cells, and meanwhile CD3$^+$ and CD4$^+$ helper T cells could also play important roles in the regulation of adaptive immunities. These protein expressions (CD8$^+$, CD3$^+$, CD4$^+$ and PD-1) on both sides of tumors were verified. As shown in FIG. 7i, tumor cell numbers in treated primary tumors (group 3 and 4) appeared significantly less, due to the effects of PTT treatment. In addition, much more CD8$^+$, CD3$^+$, CD4$^+$ and PD-1 T cells in distant tumors side were found in group 3 and 4 (combined imiquimod and light treatment group) than that in PBS and imiquimod only groups. These results clearly demonstrate that systemic administration of CPCI/imiquimoid-NP and anti-PD-1 checkpoint blockade antibody, in conjunction with local PTT are highly efficacious against local as well as distant metastatic tumors. This therapeutic concept is highly translatable and can be tested in clinical trial.

Immune-memory effects. To evaluate the immune memory induced by synergistic photothermal-immunotherapy (CPCI/Imiquimod-based PTT combining α-PD-1), the secondary 4T1 tumors were inoculated in both primary and distant sides 50 days post elimination of their first implanted tumors. Mice with same age and injected with PBS as a control. Similarly, α-PD-1 was i.p. injected into two groups' mice twice on day 67 and 73 (200 μg per mouse each time) (FIG. 8a). As shown in FIGS. 8b and 8c, the tumor volume increased rapidly in the PBS group even with the injection of α-PD-1. In marked contrast, the synergistic therapy strategy by CPCI/imiquimod-NP based PTT given in combination with α-PD-1 could significantly delay the growth of re-inoculated tumors in both sides, demonstrating this strategy have immune memory effect via activating the innate and adaptive immune systems. Unfortunately, this strategy could only delay the tumor growth, but not completely inhibit tumor recurrence, which is perhaps due to the lack of enough tumor-associate antigens generated by the first therapy.

DISCUSSION

Although near-infrared photothermal conversion agents (PTCAs) used for photothermal therapy have been investigated and applied for various tumor models for years, great challenges still remain in improving its photothermal conversion efficiency and stability including rapidly excretion from kidney or metabolism by liver in vivo and decomposition/bleaching under prolong laser irradiation. Therefore, there exists an urgent need to develop a new generation of high stability and high performance PTCAs for photothermal cancer therapy. It is clear from previous and current work that cytotoxic chemotherapeutic agents such as doxorubicin can synergize the anti-tumor effects of PTT. Since a great majority of cancer-related deaths are due to metastasis, there is great need to develop efficacious systemic therapy against metastatic diseases. Immunotherapy, particularly check-point blockade therapy by monoclonal antibodies, has emerged in recent years as very promising approach to treat clinical cancers. Such therapies are able to mobilize patients' own immune system to fight cancers. In recent years, it has been reported that PTT could also generate anti-tumor immunological effects by producing tumor-associate antigens from ablated tumor cell residues to improve antitumor immunity.

Here, the development of a new telodendrimer-based high-performance photothermal nanoparticle (CPCI-NP) that not only function as an excellent PTCA, but can also serve as a convenient and efficient controlled drug-delivery system for cancer therapy is reported. Covalent attachment of ICGD to the telodendrimer in conjunction with interpolymer crosslink by disulfide bonds enable CPCI-NP to gather high density ICGD and π-electron interactions to guarantee high photothermal conversion efficiency and photostability after self-assembly. Photothermal conversion efficiency of CPCI-NP remained high (more than 70° C.) even after 5 cycle's of laser irradiation. It's noteworthy that the temperature of CPCI-NP solution almost reached maximum just after 60 seconds irradiation (808 nm, 0.8 W cm$^{-2}$), suggesting that the unique configuration of ICGD has contributed to this desirable photothermal property. Hybrid telodendrimer comprised of hydrophobic ICGD and facial amphiphilic cholic acid units has provided an ideal platform for the encapsulation and delivery of chemotherapeutic agents or immunomodulators. For example, CPCI/DOX-NP possesses an ideal small particle size (~20 nm), which are prone to accumulate into target tumor site and penetrate into deeper tissue for deep treatment after longer blood circulation (maximum concentration of CPCI/DOX-NP in tumor site after 36 h). The presence of disulfide cross-link guaranteed the stability of NPs and limit the premature release of DOX in the blood circulation; whereas DOX could be controllably released from NPs under the reducing environment of cells, under the irradiation of 808 nm laser (FIG. 40, or on-demand release through administration of N-acetyl cysteine.

Using an orthotopic oral cancer xenograft model has demonstrated that combination photothermal-/chemotherapy with CPCI/DOX-NP was highly efficacious, with laser illumination 24 and 48 hr after administration of the nanoparticles. Since significant portion of CPCI/DOX-NP remains in the tumor site up to at least five days, it conceivably may repeat phototherapy multiple times over a course of 5 days. Such treatment approach may allow continual phototherapy as the tumor regresses, such that even deeper tumor beyond the superficial 5 mm can be reached. ICGD was chosen because (1) of its higher absorption wavelength (808 nm), therefore deeper light penetration for phototherapy, and (2). ICG with fluorescent emission wavelength of 808 nm, has already been used in the clinics as optical imaging probe for several decades. Thus CPCI/DOX-NP, not only can serve as an excellent PTCA, it can also be used as tumor targeting probes for image-guided surgery. In addition, it has great clinical potential to be used for intraoperative photothermal therapy, when the tumor margins and tumor beds are easily accessible to light therapy in the operating room.

In addition to local therapy, CPCI-NP can also be used for systemic immunotherapy, particularly when loaded with immunomodulators such as the FDA approved imiquimod. Encapsulation with CPCI-NP renders i.v. imiquimod much less toxic, and allows systemic delivery of imiquimod to all the tumor sites via EPR effects. Local light irradiation of superficial tumors or tumors accessible to endoscopy is expected to generate tumor-associated antigens and sensitization of immune cells locally, which can subsequently be disseminated to other metastatic tumor sites, causing abscopal anti-tumor effects. Such photo-immunotherapy when given in conjunction with check-point blockage antibody to be highly efficacious is expected. This concept was tested in 4T1 syngeneic orthotopic breast cancer model. Upon NIR-induced photothermal ablation of primary tumors after systemic injection of CPCI/imiquimod-NP, the released tumor-associated antigens in combination with imiquimod adjuvant show strong immunological responses, especially with the help of anti-PD-1 checkpoint-blockade therapy to activate plenty of antigen-specific T-cells and meanwhile inhibit the activities of immune-suppressive regulatory T cells (Tregs), which could attack distant tumor cells remaining in the mouse body. Another experiment demonstrates that this combination photo-immunotherapy strategy could significantly delay tumor formation and slow down tumor growth when the treated mice were rechallenged by implantation of new 4T1 tumor cells.

In summary, the new generation of PTCA based on a co-assembled binary telodendrimer exhibited superior photothermal conversion efficiency, heating capability and stability for photothermal therapy. It could be further utilized as a multifunctional nanoplatform that combines chemotherapy for synergistic treatment of in situ oral cancer and immunotherapy for synergistic treatment of metastatic breast cancer, respectively. This highly promising nanoplatform shows enormous potential for clinical translation against many different tumor types. It is expected that their efficacy could be further improved by introducing tumor targeting ligands to the nanocarriers.

Methods

Materials. Monomethylterminated poly(ethylene glycol) monoamine (MeO-PEG-NH$_2$, Mw: 5000 Da) was purchased from Rapp Polymere (Germany). 4-Carboxyphenylboronic acid, 4-Carboxyphenylboronic acid pinacol ester, 3-Carboxy-5-nitrophenylboronic acid and 3-Carboxy-5-nitrophenylboronic acid pinacol ester were obtained from Combi-Blocks (San Diego, CA). (Fmoc)lys(Boc)-OH, (Fmoc)Lys (Fmoc)-OH, (Fmoc)Cys(Trt)eOH and (Fmoc)Ebes-COOH were purchased from AnaSpec Inc. (San Jose, CA). All other chemicals were purchased from Sigma-Aldrich (St. Louis).

Synthesis of indocyanine green derivative (ICGD). Briefly, 1,1,2-trimethylbenz[e]indole (I) and iodoethane (1.5 eq) reacted in acetonitrile solution under 90° C. heating and reflux for 3 days. After that, ether was added to produce 3-ethyl-1,1,2-trimethyl-1H-benzo[e]indol-3-ium (product II). Then crude product (II) was added to N-[5-(phenylamino)-2,4-pentadienylidene]aniline monohydrochloride (1 eq) in acetic anhydride. The mixture was heated to 100° C. for 1.5 h, cooled to RT, and added to deionized water. After filtered, product (III) 3-ethyl-1,1-dimethyl-2((1E,3E,5E)-6-(N-phenylacetamido)hexa-1,3,5-trien-1-yl)-1H-benzo[e]indol-3-ium was obtained. In addition, 1,1,2-trimethylbenz[e]indole (I) and 5-bromovaleric acid of potassium iodide (1.2 eq) reacted in acetonitrile solution under 100° C. heating and reflux for 5 days. After that, ether was added to produce 3-(4-carboxybutyl)-1,1,2-trimethyl-1H-benzo[e] ondol-3-ium (IV). Finally, crude IV was added into III of pyridine. The mixture was heated for 30 min at 40° C. and concentrated in vacuo to get final produce. The final crude produce was purified via silica gel column two times to get ICGD.

Synthesis of telodendrimers. The first representative ICGD/CA telodendrimer (PEG$_{5k}$-ICGD$_4$-CA$_4$, abbreviated as PIC) was synthesized via solution-phase condensation reactions from MeO-PEG-NH$_2$ utilizing stepwise peptide chemistry according to published methods (Li et al. Biomaterials 2011, 32 (27), 6633-6645). Briefly, (Fmoc)Lys (Fmoc)-OH (3 eq) was coupled on the NH$_2$ terminus of PEG using DIC and HOBt as coupling reagents until a negative Kaiser test result was obtained, thereby indicating completion of the coupling reaction. PEGylated molecules were precipitated by adding cold ether and then washed with cold ether twice. Fmoc groups were removed by the treatment with 20% (v/v) 4-methylpiperidine in dimethylformamide (DMF), and the PEGylated molecules were precipitated and washed three times by cold ether. White powder precipitate was dried under vacuum and one coupling of (Fmoc)Lys (Fmoc)-OH and one coupling of (Fmoc)lys(Boc)-OH were carried out, respectively, to generate a third generation of dendritic polylysine terminated with four Boc and Fmoc groups on one end of PEG. CA NHS ester and ICGD were coupled to the terminal end of dendritic polylysine after the removal of Fmoc with 20% (v/v) 4-methylpiperidine and the removal of Boc groups with 50% (v/v) trifluoroacetic acid in dichloromethane, respectively. The telodendrimer solution was filtered and then dialysed against water with MWCO of 3.5 KDa. Finally, the telodendrimer was lyophilized.

The second thiolated telodendrimer (named as $PEG_{5k}$-$Cys_4$-$L_8$-$CA_8$, abbreviated as PCLC) was synthesized according to U.S. Pat. No. 10,106,650 B2. Briefly, a third generation of dendritic polylysine terminated with four Boc and Fmoc groups on one end of PEG firstly was synthesized following the above method. After the removal of Boc groups with 50% (v/v) trifluoroacetic acid (TFA) in dichloromethane (DCM), (Fmoc)Cys(Trt)eOH, (Fmoc)Ebes-OH and Cholic acid NHS ester were coupled step by step to the terminal end of dendritic polylysine. The Trt groups on cysteines were removed by TFA/H2O/ethanedithiol (EDT)/triethylsilane (TIS) (94:2.5:2.5:1, v/v) resulting in PCLC thiolated telodendrimer. The thiolated telodendrimer was recovered from the mixture by three cycles of dissolution/reprecipitation with DMF and ether, respectively. Finally, the thiolated telodendrimer was dissolved in acetonitrile/water and lyophilized.

The molecular weight of PIC and PCLC telodendrimer were collected on ABI 4700 MALDI-TOF/TOF mass spectrometer (linear mode) using R-cyano-4-hydroxycinnamic acid as a matrix. The monodispersed mass traces were detected for the telodendrimers, and the molecular weight of the telodendrimer from MALDI-TOF MS was almost identical to the theoretical value. $^1$H NMR spectra of the telodendrimers were recorded on an Avance 600 Nuclear Magnetic Resonance Spectrometer (Bruker) using $CDCl_3$ as solvents.

Preparation of CPCI-NP. 10 mg PIC telodendrimer was dissolved in 1 mL PBS followed by sonication for 10 min to form PIC NPs. In order to make CPIC NPs, 10 mg PCLC telodendrimer and 10 mg PCI telodendrimer were dissolved in 1 mL PBS to form micelles and then sonicated for 10 min. The thiol groups on the telodendrimer were oxidized to form disulphide linkages by air.

Preparation of CPCI/DOX-NP. Hydrophobic drugs, such as DOX or imiquimod, was loaded into CPIC NPs by the solvent evaporation method. Before the encapsulation of DOX into NPs, DOX.HCl was stirred with 3 molar equivalent of triethylamine in chloroform ($CHCl_3$)/methanol (MeOH; 1:1, v/v) to remove HCl from DOX.HCl. In all, 10 mg PCI telodendrimer and 10 mg PCLC telodendrimer along with different amounts of neutralized DOX were first dissolved in $CHCl_3$/MeOH, mixed and evaporated on rotavapor to obtain a homogeneous dry polymer film. The film was reconstituted in 1 mL PBS, followed by sonication for 30 min, allowing the sample film to disperse into nanoparticles solution. Finally, the nanoparticles solution was filtered with a 0.22-mm filter to sterilize the sample. To determine the amount of drugs, drug-loading nanoparticles were diluted with DMSO (NP solution/DMSO, 1:9, v/v) to dissociate nanoparticles. The drug-loading was analyzed on an HPLC system (Waters), wherein calibration curve was obtained using a series of drug/DMSO standard solutions with different concentrations. The imiquimod-loaded CPIC NPs were prepared via the similar method except without 3 molar equivalent of triethylamine.

Characterizations of nanoparticles. The size and size distribution of nanoparticles were measured by DLS instruments (Microtrac). The concentrations were kept at 1.0 mg $mL^{-1}$ for DLS measurements. All measurements were performed at 25° C. The morphology of nanoparticles was observed on a Philips CM-120 TEM. Briefly, the aqueous nanoparticle solution (1 mg $mL^{-1}$ toledendromer) was deposited on copper grids, with staining by phosphotungstic acid for 2 s and measured at room temperature. The size of the particles was analysed with the TEM software (DigitalMicrograph, Gatan Inc). UV-vis-NIR absorption spectra of NPs were measured by Genesys 10S UV-Vis spectrophotometer (Thermo Scientific, Waltham, MA). The fluorescence signals of NPs were measured on a fluorescence spectrometry (SpectraMax M2, Molecular Devices, Sunnyvale, CA, USA).

Stability of nanoparticles in SDS and human plasma. The stability study was performed to monitor the change in fluorescence and particle size of PCI-NP and CPCI-NP in the presence of SDS, which was reported to be able to efficiently break down polymeric micelles. An SDS solution (7.5 mg $mL^{-1}$) was added to aqueous solutions of nanoparticles (1.5 mg $mL^{-1}$). The final SDS concentration was 2.5 mg $mL^{-1}$ and the micelle concentration was kept at 1.0 mg $mL^{-1}$. The fluorescence signal of the solutions was measured by fluorescence spectrometer. The size and size distribution of the nanoparticles solutions were monitored at predetermined time intervals by DLS. The stability of the micelles was also evaluated in the presence of GSH (10 mM) together with SDS. The stability of DOX-loading CPCI/DOX-NP was further studied in 10% (v/v) plasma from healthy human volunteers. The mixture was incubated at physiological body temperature (37° C.) followed by size measurements at predetermined time intervals up to 96 h.

Photothermal effect of nanoparticles. 1 mL of PCI-NP (ICGD dose 30 μg $mL^{-1}$), CPCI-NP (ICGD dose 30 μg $mL^{-1}$) and polyethylene glycol (PEG) coated gold nanorod (GNRs concentration: 18 μg $mL^{-1}$) was added into a 4 mL transparent quartz vial, respectively. The solution was irradiated with a fiber-coupled continuous semiconductor diode laser (808 nm, Beijing Viasho Technology Co., Ltd., China). The power density was 0.8 W $cm^2$, and the temperature was monitored with a thermal infrared imaging camera (Flir C2, USA). To study the photostability of CPCI-NP, 1 mL of CPCI-NP (ICGD concentration at 30 μg $mL^{-1}$) PCI-NP (ICGD concentration at 30 μg $mL^{-1}$) or ICG (30 μg $mL^{-1}$) aqueous solution was irradiated with 808 nm laser for 5 min and then cooled down to the room temperature.

In vitro penetration depth and thermal effect of nanoparticles. To investigate the relationship of heating effect and tissue penetration depth of CPCI-NP under laser irradiation at 808 nm, simulation experiment in vitro was first designed. This experiment was divided into two groups: (1) CPCI-NP and (2) PCLC/TBAI&ICG NPs. Group (2) was prepared by following method: the complex of free ICG and tetra-n-butylammonium iodide (TBAI) via electrostatic interactions could be physically encapsulated into PCLC toledendrimer, named as PCLC/TBAI&ICG NPs. Hotpot beef was chose as simulation tissue and cut into square pieces (thickness of each piece: 2 mm). 100 μL CPCI-NP (ICGD concentration at 30 μg $mL^{-1}$) or PCLC/TBAI&ICG NPs (free ICG concentration: 30 μg mL$^{-1}$) solutions was dripped on the surface of beef and 808 nm laser (0.8 W cm$^{-2}$, 2 min) was applied from the below of device. Temperature and beef piece thickness were recorded by thermal infrared camera.

DOX release from CPCI/DOX-NP. In vitro DOX release profiles from CPCI/DOX-NP were further measured by the dialysis method. The drug release experiment was divided into three groups (n=3): (1) PBS, (2) GSH (10 mM), (3) GSH (10 mM) with NIR irradiation (808 nm laser, 0.8 W cm$^{-2}$). First, 500 μL of CPCI/DOX-NP solution (with DOX concentration at 1 mg mL$^{-1}$) was transferred into a dialysis bag to dialyze against DI water. All groups were first evaluated for 4 h at 37° C. with shaking. After that, group (2) was added GSH. Group (3) was added GSH and irradiated under laser at 808 nm three times at appropriate time points. For all groups, 10 μL of solutions were taken out at desired time points, and then was added into one bottle with 90 μL DMSO. The released DOX content was analyzed on an HPLC system (Waters), wherein calibration curve was obtained using a series of drug/DMSO standard solutions with different concentrations. Data were reported as the average percentage of DOX accumulative release for each triplicate sample.

In vitro cell experiments. The in vitro cell cytotoxicity, cellular uptake study and combination therapy of samples were assessed on human OSC-3 oral cancer cell line, which was purchased from American type culture collection (ATCC). The cells were cultured with DMEM supplemented with 10% FBS and 1% Penicillin at 37° C. in humidified atmosphere with 5% $CO_2$ for 24 h. Then the samples were added to each well and the cells were incubated at 37° C. for an additional 24 h. After the incubation, the relative cell viabilities were measured by the MTS assay. To assess cellular uptake, OSC-3 cells were seeded into 96-well plates and incubated with CPCI/DOX-NP (DOX concentration: 25 μg mL$^{-1}$) for another 6 h. After DAPI staining for half an hour, cellular uptake was determined by confocal images. For in vitro chemo-/photothermal combination therapy, OSC-3 cells were seeded into 96-well plates (n=3) and incubated with different samples for 4 h, followed by exposure to an 808 nm NIR laser (0.8 W cm$^2$, 2 min). Thereafter, the cells were incubated for another 24 h at 37° C. and MTS reagent was added into each well. The relative cell viabilities were then measured by MTS assay. Percentage of cell viability represents drug effect, and 100% means all cells survived. Cell viability was calculated using the following equation: Cell viability (%)=(OD490 nm of treatment/OD490 nm of blank control)×100%. For in vitro cells apoptosis experiment, OSC-3 cells were co-cultured with different samples (DOX concentration: 25 μg mL$^{-1}$ and 808 nm NIR laser (0.8 W cm$^2$, 2 min), if applied) for 8 h. Cells were washed two times and replaced with fresh medium. Then, cells were co-cultured with PI/Dio FITC for 30 min in a 12-well plate. Cell apoptosis was monitored utilizing fluorescence microscopy. Representative FCM analysis scattergrams of PI/Annexin V showed apoptosis in the four groups.

In vivo blood elimination kinetics. The jugular vein of female Sprague-Dawley rats was implanted with catheter for blood collection (Harland, Indianapolis, IN, USA). Free ICG, PCLC/TBAI&ICG NPs and CPCI-NP at identical ICG concentration were injected through the catheter at a dose of 5 mg kg$^{-1}$ body weight (n=3 for each group). All of the blood samples were collected from the catheter at different time point. Micro-plate reader (SpectraMax M2) was used to measure the ICG concentration at absorbance at 808 nm.

Animal model: All animal experiments were in accordance with protocols No. 19724, which approved by the Animal Use and Care Administrative Advisory Committee at the University of California, Davis. In situ OSC-3 Oral cancer model: female nude mice are 6-8 weeks of age, which were purchased from Harlan (Livermore, CA, USA The orthotopic oral cancer model was implanted in lip which was the first time established. Each female nude mouse was implanted by injecting 1×10$^6$ OSC-3 oral cancer cells in 10 μL of PBS. The mice bearing OSC-3 oral tumors were treated when the volume of tumor reached about ~50 mm$^3$. 4T1 breast cancer model: Female Balb/c mice (8-10 weeks) were purchased from Harlan (Livermore, CA, USA). 4T1 cells (1×10$^6$) suspended in 80 μL mixture of PBS and Matrigel (1:1 v/v), then were injected into the forth breast fat pad. The mice bearing 4T1 tumors were treated when the volume of tumor reached about ~50 mm$^3$.

In vivo/Ex vivo fluorescence imaging. Nude mice bearing mice bearing in situ OSC-3 oral cancer were subjected to tail vein injection of CPCI/DOX-NP at a dose of 7 mg ICGD per Kg body weight. Mice under isoflurane anesthesia were imaged using in vivo fluorescence imaging system (Carestream In-Vivo Imaging System FX PRO, USA) at pre-designed time points. At 48 h after NPs injection, all animals were sacrificed and their organs of interest were excised for ex vivo imaging.

In vivo cancer treatment. In situ OSC-3 oral cancer tumor-bearing mice were injected with PBS, free DOX (2.5 mg kg$^{-1}$), PCI-NP (PCI telodendrimo 25 mg kg$^{-1}$; ICGD 7 mg kg$^{-1}$), CPCI-NP (total telodendrimo 50 mg kg$^{-1}$; ICGD 7 mg kg$^{-1}$), CPCI/DOX-NP (total telodendrimo 50 mg kg$^{-1}$; DOX 2.5 mg kg$^{-1}$, ICGD 7 mg kg$^{-1}$). After 24 h and 48 h, tumors were locally illuminated two times by laser (0.8 W cm$^{-2}$ for 2 min) under general anaesthesia, and beam spot cover the whole tumor. Mice were treated once per week for two cycles. Thermal camera (FLIR) was used to record tumor surface temperature. Tumor volume was measured twice a week by caliper and where "w" and "1" are width and length of the tumor. The treatment lasted for thirty days. Mice were killed once the body weight loss twenty percentages or tumor growing affect drinking water and eating. Mice bearing 4T1 tumor were randomly divided into seven groups (n=6) for treatments with PBS, CPCI/Imi, CPCI+L, CPCI/Imi+L, CPCI/Imi+α-PD-1, CPCI/Imi+L+α-PD-1 and CPCI/Imi+L+α-PD-1 (1 cycle) (ICGD 7 mg kg$^{-1}$, Imiquimod 1.25 mg kg$^{-1}$, intraperitoneal injection of anti-PD-1 200 μg per mouse), respectively. When tumor volume reached about 50 mm$^3$, treatments were performed. Tumor sizes were measured twice a week and calculated using the following equation: volume=0.5×L×W$^2$.

Histology studies. OSC-3 oral tumor-bearing mice were sacrificed after 2 cycle's treatment post-injection. Tumor tissues were fixed and embedded in paraffin. Haematoxylin and eosin (H&E) staining slides were prepared by BBC Biochemical (Mount Vernon, WA) and observed using microscopy.

Although the foregoing invention has been described in some detail by way of illustration and Example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A nanoparticle comprising a plurality of first conjugates and further comprising a plurality of second conjugates, wherein each first conjugate is independently a compound of formula (I):

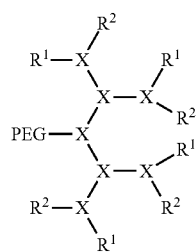

wherein:

PEG is a polyethylene glycol (PEG) polymer, wherein each PEG polymer has a molecular weight of 1-10 kDa;

each X is independently 2,3-diamino propanoic acid, 2,4-diaminobutanoic acid, 2,5-diaminopentanoic acid (ornithine), 2,6-diaminohexanoic acid (lysine), (2-Aminoethyl)-cysteine, 3-amino-2-aminomethyl propanoic acid, 3-amino-2-aminomethyl-2-methyl propanoic acid, 4-amino-2-(2-aminoethyl) butyric acid, or 5-amino-2-(3-aminopropyl) pentanoic acid;

each $R^1$ is independently cholic acid (3α, 5β, 7α, 12α)-7,12-dihydroxy-3-(2,3-dihydroxy-1-propoxy)-cholic acid (CA-4OH), (3α, 5β, 7α, 12α)-7-hydroxy-3,12-di(2,3-dihydroxy-1-propoxy)-cholic acid (CA-5OH), or (3α, 5β, 7α, 12α)-7,12-dihydroxy-3-(3-amino-2-hydroxy-1-propoxy)-cholic acid (CA-3OH—NH$_2$); and each $R^2$ is independently cyanine 3, cyanine 3.5, cyanine 5, cyanine 5.5, cyanine 7, cyanine 7.5, indocyanine green, or a indocyanine green derivative with a structure (S1):

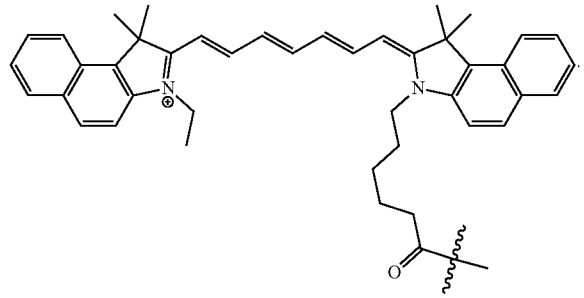

wherein each second conjugate is independently a compound of formula (II):

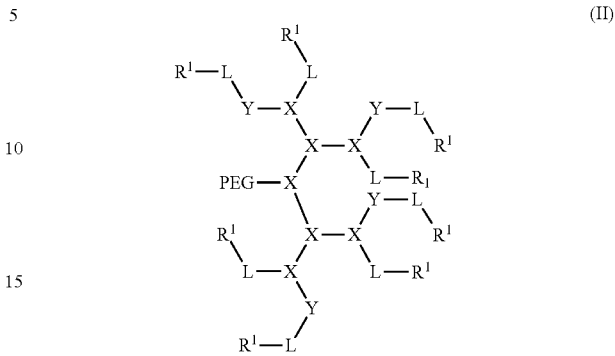

wherein:

PEG is a polyethylene glycol (PEG) polymer, wherein each PEG polymer has a molecular weight of 1-10 kDa;

each X is independently 2,3-diamino propanoic acid, 2,4-diaminobutanoic acid, 2,5-diaminopentanoic acid (ornithine), 2,6-diaminohexanoic acid (lysine), (2-Aminoethyl)-cysteine, 3-amino-2-aminomethyl propanoic acid, 3-amino-2-aminomethyl-2-methyl propanoic acid, 4-amino-2-(2-aminoethyl) butyric acid, or 5-amino-2-(3-aminopropyl) pentanoic acid;

each Y is independently cystein;

each L is independently an Ebes linker having the formula

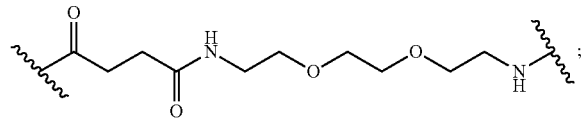 [SMILES: *NCCOCCOCCNC(=O)CCC(*)=O]

and each $R^1$ is independently cholic acid, (3α, 5β, 7α, 12α)-7,12-dihydroxy-3-(2,3-dihydroxy-1-propoxy)-cholic acid (CA-4OH), (3α, 5β, 7α, 12α)-7-hydroxy-3,12-di(2,3-dihydroxy-1-propoxy)-cholic acid (CA-5OH), or (3α, 5β, 7α, 12α)-7,12-dihydroxy-3-(3-amino-2-hydroxy-1-propoxy)-cholic acid (CA-3OH—NH$_2$), and wherein:

the plurality of conjugates self-assembles in an aqueous solvent to form the nanoparticle such that a hydrophobic core is formed in the interior of the nanoparticle, wherein the PEG of each conjugate self-assembles on the exterior of the nanoparticle.

2. The nanoparticle of claim 1, wherein each of the first conjugates is the compound wherein:
each PEG has a molecular weight of 5 kDa;
each X is lysine;
each $R^1$ is cholic acid; and
each $R^2$ is a cyanine with the structure (S1).

3. The nanoparticle of claim 1, wherein each second conjugate is the compound of formula (II) wherein:
each PEG has a molecular weight of 5 kDa;
each X is lysine; and
each $R^1$ is cholic acid.

4. The nanoparticle of claim 1, wherein the conjugates of formula (II) are crosslinked via the cysteine.

5. The nanoparticle of claim 1, wherein the conjugates of formula (I) and formula (II) are in a ratio of about 1:1 w/w.

6. The nanoparticle of claim 5, wherein the mean diameter of the nanoparticle is about 20 nm.

7. The nanoparticle of claim 1, further comprising a therapeutic drug in the hydrophobic core.

8. The nanoparticle of claim 7, wherein the therapeutic drug is selected from the group consisting of gardiquimod, doxorubicin, daunorubicin, vincristine, vinblastine, paclitaxel, SN-38, imiquimod, resiquimod, motolimod, lenalidomide, pomalidomide, and LLS30 having the structure (S2):

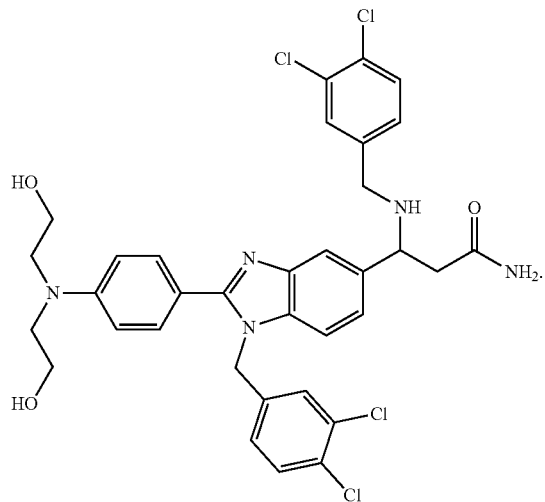 [SMILES: NC(=O)CC(NCc1ccc(Cl)c(Cl)c1)c1ccc2c(c1)nc(-c1ccc(N(CCO)CCO)cc1)n2Cc1ccc(Cl)c(Cl)c1]

9. A method of treating a disease, the method comprising administering a therapeutically effective amount of a nanoparticle of claim 1, to a subject in need thereof.

10. A method of treating a disease via photothermal therapy, the method comprising administering a therapeutically effective amount of a nanoparticle of claim 1, to a subject in need thereof, and exposing the subject to radiation, thereby treating the disease via photothermal therapy.

11. A method of treating a subject suffering from a diseased tissue, the method comprising:
    administering an effective amount of nanoparticles of claim 1, to the subject such that the nanoparticles concentrate in the diseased tissue;
    irradiating at a first wavelength the diseased tissue to identify the diseased tissue; and
    removing the diseased tissue from the subject, thereby treating the subject.

12. A method of imaging, the method comprising:
    administering an effective amount of nanoparticles of claim 1, to a subject in need thereof; and
    imaging the subject.

13. A method of preparing a nanoparticle of claim 1, comprising:
    forming a reaction mixture comprising a plurality of first conjugates of claim 1, a plurality of second conjugates of claim 1, and an aqueous solution, wherein the conjugates self-assemble to form nanoparticles such that a hydrophobic core is formed in the interior of the nanoparticle, wherein the PEG of each conjugate self-assembles on the exterior of the nanoparticle.

* * * * *